(12) United States Patent
Jain et al.

(10) Patent No.: US 11,811,735 B2
(45) Date of Patent: *Nov. 7, 2023

(54) USE OF STATELESS MARKING TO SPEED UP STATEFUL FIREWALL RULE PROCESSING

(71) Applicant: Nicira, Inc., Palo Alto, CA (US)

(72) Inventors: Jayant Jain, Cupertino, CA (US); Anirban Sengupta, Saratoga, CA (US); Mohan Parthasarathy, Cupertino, CA (US); Xinhua Hong, Milpitas, CA (US)

(73) Assignee: NICIRA, INC., Palo Alto, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/321,423

(22) Filed: May 15, 2021

(65) Prior Publication Data

US 2021/0273911 A1 Sep. 2, 2021

Related U.S. Application Data

(60) Division of application No. 15/816,708, filed on Nov. 17, 2017, now Pat. No. 11,019,030, which is a
(Continued)

(51) Int. Cl.
*G06F 21/00* (2013.01)
*H04L 9/40* (2022.01)
(Continued)

(52) U.S. Cl.
CPC ........ *H04L 63/0254* (2013.01); *H04L 43/028* (2013.01); *H04L 63/0263* (2013.01); *H04L 69/22* (2013.01); *H04L 69/326* (2013.01)

(58) Field of Classification Search
CPC ............... H04L 63/0254; H04L 43/028; H04L 63/0263; H04L 69/22; H04L 69/326
See application file for complete search history.

(56) References Cited

U.S. PATENT DOCUMENTS 6,141,749 A 10/2000 Coss et al.
6,496,935 B1 12/2002 Fink et al.
(Continued)

FOREIGN PATENT DOCUMENTS

EP 2748750 A1 7/2014
WO 2008095010 A1 8/2008
(Continued)

OTHER PUBLICATIONS

Author Unknown, "Cisco Identity-Based Firewall Security," Month Unknown 2011,2 pages, CISCO Systems, Inc.
(Continued)

*Primary Examiner* — Michael M Lee
(74) *Attorney, Agent, or Firm* — ADELI LLP

(57) ABSTRACT

A novel method for stateful packet classification that uses hardware resources for performing stateless lookups and software resources for performing stateful connection flow handshaking is provided. To classify an incoming packet from a network, some embodiments perform stateless look up operations for the incoming packet in hardware and forward the result of the stateless look up to the software. The software in turn uses the result of the stateless look up to perform the stateful connection flow handshaking and to determine the result of the stateful packet classification.

20 Claims, 16 Drawing Sheets

Related U.S. Application Data continuation of application No. 14/295,544, filed on Jun. 4, 2014, now Pat. No. 9,825,913.

(51) Int. Cl.
*H04L 69/326* (2022.01)
*H04L 69/22* (2022.01)
*H04L 43/028* (2022.01)

(56) References Cited

U.S. PATENT DOCUMENTS

| | | | |
|---|---|---|---|
| 6,594,704 B1 | 7/2003 | Birenback et al. | |
| 6,738,821 B1 | 5/2004 | Wilson et al. | |
| 6,856,995 B1 | 2/2005 | Ibitayo et al. | |
| 6,880,089 B1 | 4/2005 | Bommareddy et al. | |
| 6,963,921 B1* | 11/2005 | Yang | H04L 69/161 |
| | | | 709/233 |
| 7,055,173 B1 | 5/2006 | Chaganty et al. | |
| 7,136,926 B1* | 11/2006 | Iyer | H04L 63/0263 |
| | | | 709/229 |
| 7,349,382 B2 | 3/2008 | Marimuthu et al. | |
| 7,512,071 B2 | 3/2009 | Goldschmidt et al. | |
| 7,760,733 B1 | 7/2010 | Eiriksson et al. | |
| 7,774,502 B2 | 8/2010 | Murthy et al. | |
| 7,818,452 B2 | 10/2010 | Matthews et al. | |
| 7,913,294 B1 | 3/2011 | Maufer et al. | |
| 7,948,986 B1 | 5/2011 | Ghosh et al. | |
| 8,032,933 B2 | 10/2011 | Turley et al. | |
| 8,108,550 B2 | 1/2012 | Lahoti et al. | |
| 8,145,768 B1 | 3/2012 | Hawthorne | |
| 8,190,767 B1 | 5/2012 | Maufer et al. | |
| 8,194,674 B1 | 6/2012 | Pagel et al. | |
| 8,365,294 B2 | 1/2013 | Ross | |
| 8,615,009 B1 | 12/2013 | Ramamoorthi et al. | |
| 8,660,129 B1 | 2/2014 | Brendel et al. | |
| 9,008,082 B2 | 4/2015 | Dyke | |
| 9,015,823 B2 | 4/2015 | Koponen et al. | |
| 9,729,512 B2 | 8/2017 | Jain et al. | |
| 9,825,913 B2 | 11/2017 | Jain et al. | |
| 11,019,030 B2 | 5/2021 | Jain et al. | |
| 2003/0005144 A1 | 1/2003 | Engel et al. | |
| 2003/0093481 A1 | 5/2003 | Mitchell et al. | |
| 2003/0123452 A1 | 7/2003 | Cox et al. | |
| 2003/0161272 A1* | 8/2003 | Teplitsky | H04L 45/00 |
| | | | 370/254 |
| 2003/0212900 A1 | 11/2003 | Liu et al. | |
| 2004/0022259 A1 | 2/2004 | Tuchow | |
| 2004/0049701 A1 | 3/2004 | Pennec et al. | |
| 2005/0114337 A1* | 5/2005 | Lunteren | H04L 45/00 |
| | | | 707/999.009 |
| 2005/0198125 A1 | 9/2005 | Beck et al. | |
| 2005/0229246 A1 | 10/2005 | Rajagopal et al. | |
| 2005/0238022 A1 | 10/2005 | Panigrahy | |
| 2006/0002386 A1* | 1/2006 | Yik | H04L 49/3063 |
| | | | 370/469 |
| 2006/0191003 A1 | 8/2006 | Bahk et al. | |
| 2007/0011734 A1 | 1/2007 | Balakrishnan et al. | |
| 2007/0061492 A1 | 3/2007 | Riel | |
| 2008/0028097 A1* | 1/2008 | Makela | H04L 63/0254 |
| | | | 709/237 |
| 2008/0072305 A1 | 3/2008 | Casado et al. | |
| 2008/0267177 A1 | 10/2008 | Johnson et al. | |
| 2008/0289028 A1 | 11/2008 | Jansen et al. | |
| 2008/0298274 A1 | 12/2008 | Takashige et al. | |
| 2009/0007251 A1 | 1/2009 | Abzarian et al. | |
| 2009/0129271 A1 | 5/2009 | Ramankutty et al. | |
| 2009/0129394 A1 | 5/2009 | Bar-Kovetz et al. | |
| 2009/0150521 A1 | 6/2009 | Tripathi | |
| 2009/0235325 A1 | 9/2009 | Dimitrakos et al. | |
| 2009/0249470 A1 | 10/2009 | Litvin et al. | |
| 2009/0249472 A1 | 10/2009 | Litvin et al. | |
| 2009/0327781 A1 | 12/2009 | Tripathi | |
| 2010/0014526 A1 | 1/2010 | Chavan et al. | |
| 2010/0037311 A1 | 2/2010 | He et al. | |
| 2010/0100616 A1 | 4/2010 | Bryson et al. | |
| 2010/0115174 A1 | 5/2010 | Akyol et al. | |
| 2010/0125667 A1 | 5/2010 | Soundararajan | |
| 2010/0257580 A1 | 10/2010 | Zhao | |
| 2011/0016467 A1 | 1/2011 | Kane | |
| 2011/0022695 A1 | 1/2011 | Dalal et al. | |
| 2011/0072486 A1 | 3/2011 | Hadar et al. | |
| 2011/0103259 A1 | 5/2011 | Bay et al. | |
| 2011/0113467 A1 | 5/2011 | Agarwal et al. | |
| 2011/0134920 A1 | 6/2011 | Dyke | |
| 2011/0225647 A1 | 9/2011 | Dilley et al. | |
| 2011/0246637 A1 | 10/2011 | Murakami | |
| 2012/0207039 A1 | 8/2012 | Srinivasan et al. | |
| 2012/0240182 A1 | 9/2012 | Narayanaswamy et al. | |
| 2013/0007740 A1 | 1/2013 | Kikuchi et al. | |
| 2013/0044631 A1 | 2/2013 | Biswas et al. | |
| 2013/0073743 A1 | 3/2013 | Ramasamy et al. | |
| 2013/0163594 A1 | 6/2013 | Sharma et al. | |
| 2013/0227097 A1 | 8/2013 | Yasuda et al. | |
| 2013/0227550 A1 | 8/2013 | Weinstein et al. | |
| 2013/0265883 A1* | 10/2013 | Henry | H04L 43/028 |
| | | | 370/241 |
| 2013/0332983 A1 | 12/2013 | Koorevaar et al. | |
| 2013/0346583 A1 | 12/2013 | Low et al. | |
| 2014/0068602 A1 | 3/2014 | Gember et al. | |
| 2014/0115578 A1 | 4/2014 | Cooper et al. | |
| 2014/0164595 A1 | 6/2014 | Bray et al. | |
| 2014/0195666 A1 | 7/2014 | Dumitriu et al. | |
| 2014/0281030 A1 | 9/2014 | Cui et al. | |
| 2014/0282855 A1 | 9/2014 | Clark et al. | |
| 2014/0330977 A1* | 11/2014 | van Bemmel | H04L 69/22 |
| | | | 709/226 |
| 2014/0373148 A1 | 12/2014 | Nelms et al. | |
| 2015/0358288 A1 | 12/2015 | Jain et al. | |
| 2015/0358290 A1 | 12/2015 | Jain et al. | |
| 2015/0381494 A1 | 12/2015 | Cherian et al. | |
| 2016/0142320 A1 | 5/2016 | Gyllenhammer et al. | |
| 2017/0180273 A1 | 6/2017 | Daly et al. | |
| 2018/0097778 A1 | 4/2018 | Jain et al. | |

FOREIGN PATENT DOCUMENTS

| | | |
|---|---|---|
| WO | 2013074828 A1 | 5/2013 |
| WO | 2015187201 A1 | 12/2015 |

OTHER PUBLICATIONS

Author Unknown, "AppLogic Features," Jul. 2007, 2 pages. 3TERA, Inc.

Author Unknown, "Enabling Service Chaining on Cisco Nexus 1000V Series," Month Unknown, 2012, 25 pages, CISCO.

Author Unknown, "Next-Generation Firewalls," Month Unknown 2013, 1 page, Palo Alto Networks.

Basak, Debashis, et al., "Virtualizing Networking and Security in the Cloud," Month Unknown 2010, 9 pages, VMware, Inc., Palo Alto, CA.

Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011, 31 pages.

Guichard, J., et al., "Network Service Chaining Problem Statement," Network Working Group, Jun. 13, 2013, 14 pages, Cisco Systems, Inc.

Ioannidis, Sotiris, et al., "Implementing a Distributed Firewall," CCS '00, Month Unknown 2000, 10 pages, ACM, Athens, Greece.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Litvak, Michail, "Linux—IP-RULE(8): Routing Policy Database Management," Apr. 10, 2014, 5 pages, retrieved from https://man7.org/linux/man-pages/man8/ip-rule.8.html.

(56) References Cited

OTHER PUBLICATIONS

Pagiamtzis, Kostas, et al.,"Content-Addressable Memory (CAM) Circuits and Architectures: A Tutorial and Survey," IEEE Journal of Solid-State Circuits, Mar. 2006, 16 pages, vol. 41, No. 3.
PCT International Search Report and Written Opinion of commonly owned International Patent Application PCT/US2014/072899, dated Apr. 21, 2015, 12 pages, International Searching Authority (EPO).
Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.
Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Stojanovski, Nenad, et al., "Analysis of Identity Based Firewall Systems," Jun. 2010, 9 pages.
Stojanovski, Nenad, et al., "Architecture of a Identity Based Firewall System," Jul. 2011, 9 pages.

\* cited by examiner

USE OF STATELESS MARKING TO SPEED UP STATEFUL FIREWALL RULE PROCESSING

CLAIM OF BENEFIT TO PRIOR APPLICATIONS

The present Application is a divisional application of U.S. patent application Ser. No. 15/816,708, filed Nov. 17, 2017, now published as U.S. Patent Publication 2018/0097778. U.S. patent application Ser. No. 15/816,708 is a continuation application of U.S. patent application Ser. No. 14/295,544, filed Jun. 4, 2014, now issued as U.S. Pat. No. 9,825,913. U.S. patent application Ser. No. 15/816,708, now published as U.S. Patent Publication 2018/0097778, and U.S. patent application Ser. No. 14/295,544, now issued as U.S. Pat. No. 9,825,913, are incorporated herein by reference.

BACKGROUND

Today's hardware switches implement stateless Firewall and ACLs features. Hardware switches handle static rules and stateless processing well, as they are good at performing look ups by using bit/mask ranges/sets/tables, courtesy availability of TCAM on their hardware. Typically, rule and sets are fairly static as they do not change per packet and can be handled statelessly. However, packets themselves lead to state changes and hence have to be handled by stateful engines like in TCP.

Unfortunately, hardware switches are not suitable for performing stateful session/rule management because of memory and resource constraints. The number of connection flows supported by hardware switches is typically in the range of 32 to 64K, but the number of active sessions flowing through the wire is often far more than this. The stateful engine for each flow and rule processing is typically implemented in software to get over this limitation as it has access to almost unlimited memory.

Typical firewall rules in a datacenter are comprised of security groups, which are essentially IP sets. Hence while the rules themselves do not change, the group membership may keep changing as virtual machines (VMs) or hosts are powered up and down and the software has to look up the validity of the rules on the incoming packet based upon the source/destination address of the incoming packet belonging to these security groups/containers.

The task of identifying which security group/containers the incoming packet falls in is a very computation intensive process. Furthermore, many firewall rules in the firewall chain have to be processed in a linear order. The processing of container or security group based rules therefore adds significant amount of latency to the packet cycle that is apart from vital CPU resource utilization.

SUMMARY

Some embodiments of the invention combine the positives of stateless and the stateful features in their respective domains to bring about a very efficient system. Some embodiments provision IP sets/security groups/containers into the hardware switch in order to mark incoming packets with markings that indicate which IP sets the packet belongs to so the corresponding rules and flows can be processed by a stateful engine in software. In some embodiments, if the resource allows, rules are also provisioned on the hardware switch. In some of these embodiments, the hardware switch finds the matching rules for the initial SYN packet of a connection flow and marks the packet with the matching rule. In some embodiments, for the rest of the packets for that flow, the packet is marked with the hash ID of the connection/flow so that the lookup of the flow on the software can be simplified or accelerated. By combining fast stateless table lookups on the hardware switch and the available resource for stateful rule processing in software, the processing overhead is reduced, which leads to a better throughput from the system.

In some embodiments, packet classification operations are performed according to a set of firewall rules that determine whether a packet with certain IP address or connection ports are allowed or rejected. In some embodiments, at least some of the rules are defined with respect to IP sets or security groups, where each set or group is a container defined to include one or more IP addresses. Such a firewall rule is in some embodiments defined to allow or reject a security group as destination or as source under certain conditions. Whether a packet is allowed or rejected therefore depends on whether its source address and/or destination IP address falls within certain defined security groups or containers. A packet classification operation for an incoming packet in some of these embodiments includes look up operations that matches rules with parameters of the incoming packets and look up operations that maps source and/or destination addresses to containers.

In some embodiments, the portion of the rules that is programmed into hardware includes rules that can be performed more efficiently in hardware resources. In some embodiments, the hardware resources are limited so only the rules that the hardware has resources to handle are programmed into the hardware. A software stateful engine and the connection-tracker (conn-track) table are programmed to complete the packet classification operations based on a complete rules database. In some embodiments, the stateful engine has to handle the residual packet classification operations that the hardware in PNIC is not programmed to handle, whether it's stateful monitoring or stateless lookup.

In some embodiments, a rules table and a container table are implemented on content addressable memory (CAM) or ternary CAM (TCAM). For the container table implemented in the CAM, the source or destination address of the incoming packet is used as a key for look up in the CAM. For the rules table implemented in the CAM, the hash value of the packet's connection identifying parameters is used as a key for searching for a match in the CAM.

In some embodiments, the software running on a networking device is responsible for performing the stateful packet classification (i.e., stateful firewall) operation on incoming packets. It receives marked packets or metadata that includes results of stateless lookup operations performed by hardware. These stateless lookup results may include the identifications of the rule that matches the connection of the packet, the identification of containers (i.e., security groups or IP sets) that the source and destination IP addresses of the incoming packet belong to, or the hash value of the connection identifiers. In some embodiments, the hardware may provide only some of the stateless lookup result (e.g., only the container ID or only the hashed connection ID). Regardless what is actually provided by hardware, the software in some embodiments uses its conntrack table to perform stateful firewall operations. In some embodiments, the software also has stateless lookup capabilities to complete the stateless lookup operations that the hardware is unable to complete. In some embodiments, the software that handles stateful packet classification in a host machine is its virtualization software, which also manages the computing and network resources for virtual machines (VMs) executing on the host.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for stateful packet classification that uses hardware resources for performing stateless lookups and software resources for performing stateful connection flow handshaking. To classify an incoming packet from a network, some embodiments perform stateless look up operations for the incoming packet in hardware and forward the result of the stateless look up to the software. The software in turn uses the result of the stateless look up to perform the stateful connection flow handshaking and to determine the result of the stateful packet classification.

In some embodiments, the stateful packet classification is based on rules that classifies whether a packet with a particular set of parameters should be allowed. In some embodiments, at least some of the rules are defined with respect to containers, each container may be defined to include a set of IP addresses. In some embodiments, the hardware performs look up operation to match each incoming packet with one or more applicable rules. In some embodiments, the hardware maps each source or destination IP address into one or more containers of IP addresses. In some of these embodiments, the identifiers of the mapped rules and/or containers are forwarded to the software for stateful packet classification.

Figure 1:
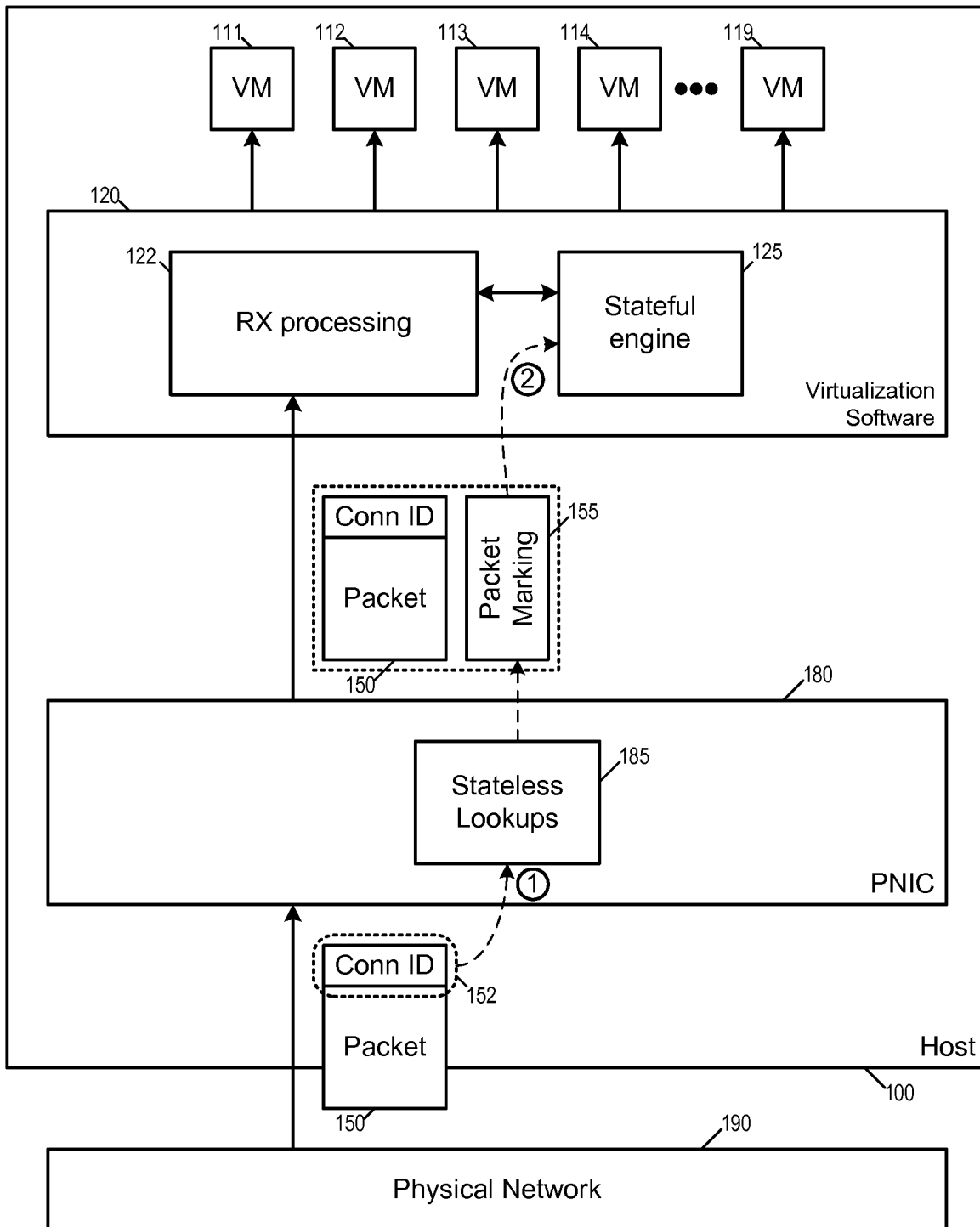
FIG. 1 illustrates a networking device that performs both stateful and stateless packet classification.

FIG. 1 illustrates a networking device 100 that performs both stateful and stateless packet classification. The network device 100 offloads stateless processing to a physical network interface controller (PNIC) 180. The PNIC 180 performs stateless look up operations on incoming packets such as the packet 150, and the result of the stateless look up are passed to the software components executing on the network device 100. The software components in turn use the results of the stateless look up operations to perform stateful packet classification operations on the incoming packets. In some embodiments, these packet classification operations are for performing firewall operations that decide whether a packet should be rejected, accepted, or forwarded based on a set of firewall rules.

The network device 100 is a host machine that supports one or more virtual machines. It communicates with other network devices, including other host machines in a network environment through the physical network medium 190. As illustrated, the host machine 100 is operating virtualization software 120, which allows the host machine 100 to provide communication and computing resources to virtual machines 111-119. The host machine 100 also has a PNIC 180 for interfacing with the physical network medium 190.

The PNIC 180 provides the interface to the physical network medium 190. In some embodiments, the PNIC is a network adaptor that has dedicated network interfacing hardware for processing incoming and outgoing network traffic without consuming processor (i.e., CPU) cycles of the host machine, which is already operating the virtualization software 120 and other software components. In some embodiments, the PNIC 180 includes resources for performing L2 switching and ACL (access control list) capabilities and therefore can be referred to as a hardware switch. For some embodiments, the hardware that is referred to as PNIC in this document includes many hardware components in addition to those that are used as interface to the physical network. In some embodiments in which the PNIC 180 includes L2 switch capabilities (and hence can be referred to as a hardware switch), the PNIC 180 handles at least some of the L2 switching operations of the incoming packets, in place of or in conjunction with software L2 switching capabilities provided by the virtualization software 120. In some of these embodiments, the PNIC 180 as a hardware switch delivers data packets to the virtualization software 120 through one of its physical ports.

As illustrated, the PNIC 180 has a stateless look up module 185 that includes the hardware necessary for supporting fast look up operations. In some embodiments, the stateless look up module 185 performs efficient look up operations by using bit/mask ranges/sets/tables. In some embodiments, the stateless look up module 185 includes hardware content addressable memory (CAM) or ternary content addressable memory (TCAM) that is capable of quickly finding and retrieving entries that matches the object or the criteria of the look up operation.

The virtualization software 120 implements and manages the VMs 111-119. Virtualization software may include one or more software components and/or layers, possibly including one or more of the software components known in the field of virtual machine technology as virtual machine monitors (VMMs), hypervisors, or virtualization kernels. Because virtualization terminology has evolved over time and has not yet become fully standardized, these terms do not always provide clear distinctions between the software layers and components to which they refer. As used herein, the term, "virtualization software" is intended to generically refer to one or more software layers or components logically interposed between a virtual machine and the host platform. Since in some embodiments, the network device 100 is a computing device having significant amount of memory, the virtualization software 120 has access to sufficient resources for maintaining stateful operations for many different connections or flows.

When the packet 150 arrives at the host machine 100, the host machine performs stateless and stateful packet classification operations on the packet 150. Specifically, the look up hardware of the PNIC 180 performs stateless look up operations on the packet 150. In some embodiments, this look up is based on connection or flow identifiers 152 in the packet 150 (e.g., the five-tuple of source/destination IP addresses, source/destination ports, and connection protocol). The result of the stateless look up is forwarded to the virtualization software 120 for stateful processing of the packet 150. In some embodiments, the PNIC passes the stateless look up result to the virtualization software 120 along with the packet 150 by marking the packet 150. In some embodiments, the PNIC passes stateless look up result to the virtualization software 120 as metadata 155 associated with the packet 150. For example, in some embodiments, the packet may be "passed" to the virtualization software 120 by performing a direct memory access (DMA) operation to write the contents of packet 150 and any associated marking or metadata to memory (not separately shown) of host 100. An interrupt event or other notification may be raised to virtualization software 120 so that it can act on the arrival of the packet. In some embodiments in which the PNIC 180 is a hardware switch, the PNIC 180 delivers the stateless look up results as packet markings on the packet 150, which is sent through a physical port of the hardware switch.

The virtualization software 120 is illustrated as having a RX (receive) processing module 122 and the stateful engine 125. The RX processing module 122 decides to which, if any, VM a packet received from the PNIC should go (by e.g., performing L2 switching and/or L3 routing operations). The RX processing module 122 can prevent a packet from arriving at any of the VMs if instructed to do so by the stateful engine 125. For example, the stateful engine 125 may instruct the RX processing module 122 to block the packet 150 if the stateful engine, upon processing the metadata 155 (i.e., packet marking), classifies the packet 150 as being impermissible under a set of firewall rules. In some embodiments, the operation performed by the stateful engine is "stateful" because the decision to allow or reject a packet is based on the state of the transport layer (i.e., layer 4 or L4) connection or flow that the packet belongs to. Namely, the stateful engine keeps track of the protocol exchanges (through packet transmissions) that have taken place over the transport layer connection in order to make the firewall assessment. In some embodiments, the transport layer connection is based on Transmission Control Protocol (TCP), and hence the L4 or transport layer connection is referred to as a TCP connection. However, such stateful decision is also based on the stateless look up results in the packet marking 155 provided by the hardware in PNIC 180, and/or the connection identifiers 152.

As mentioned, packet classification operations are performed according to a set of firewall rules that determine whether a packet with certain IP address or connection ports are allowed or rejected. In some embodiments, at least some of the rules are define with respect to IP sets or security groups, where each set or group is a container defined to include one or more IP addresses. Such a firewall rule is in some embodiments defined to allow or reject a security group as destination or as source under certain conditions. Whether a packet is allowed or rejected therefore depends on whether its source address and/or destination IP address falls within certain defined security groups or containers. A packet classification operation for an incoming packet in some of these embodiments includes look up operations that matches rules with parameters of the incoming packets and look up operations that maps source and/or destination addresses to containers.

Figure 2:
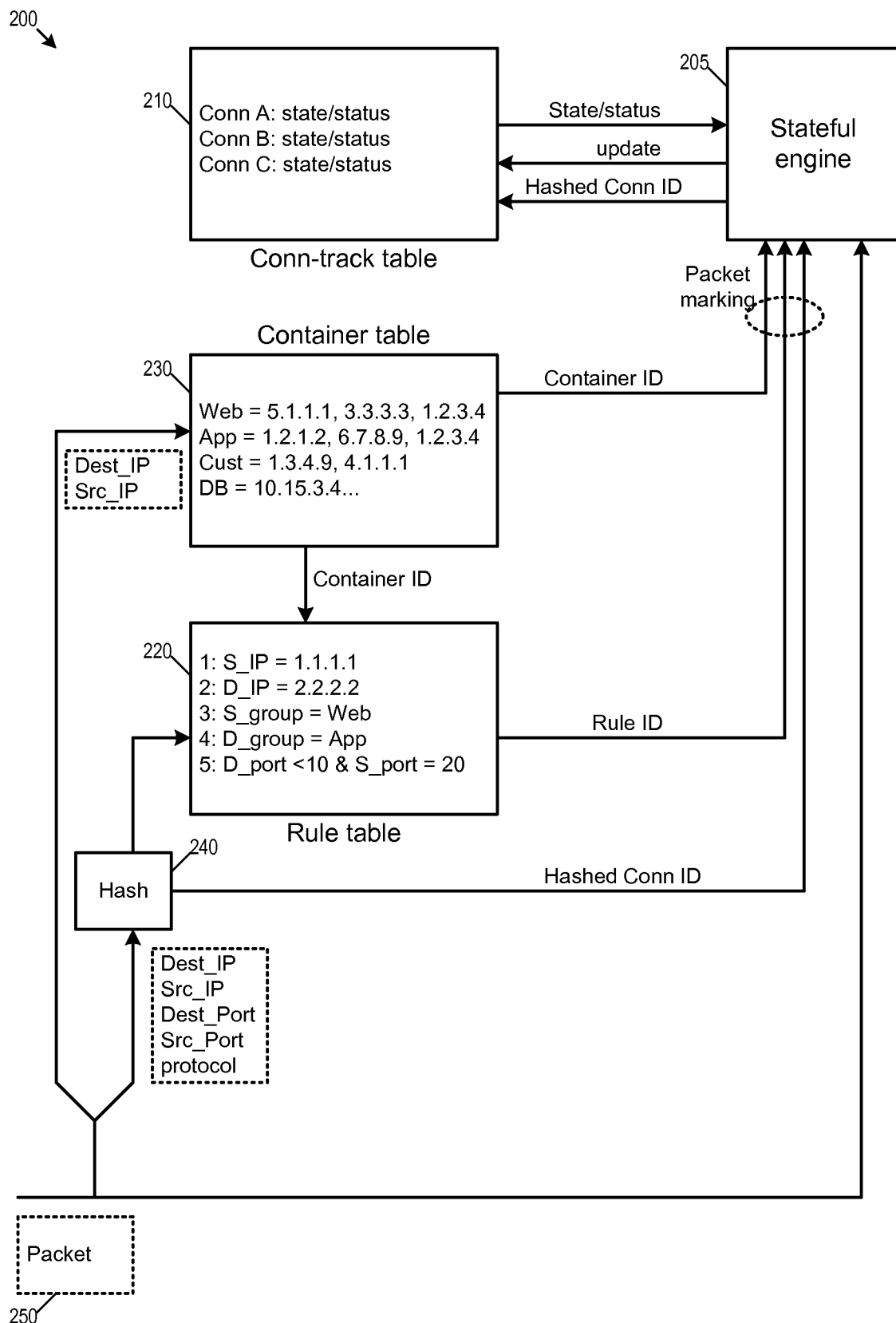
FIG. 2 illustrates a packet classification system that performs looks up for rule matching and for container mapping.

FIG. 2 illustrates a packet classification system 200 that performs looks up for rule matching and for container mapping. The system 200 also performs stateful packet classification of an incoming packet 250 by monitoring transport layer (i.e., L4) protocols packets. The system 200 includes a connection tracker (conn-track) table 210, a rules look up table 220, a container look up table 230, a stateful engine 205, and an identifier hash unit 240. In some embodiments, this system is implemented on the software and the hardware of the host machine 100. Specifically, the rules table 220, the container table 230, and the identifier hash unit 240 may be implemented in hardware, while the conn-track table 210 and the stateful engine 205 may be implemented in software. The output of the hardware lookup operations in rules table and container table may be passed along to the software stateful engine 205 as packet marking or metadata for the incoming packet 250 as described above.

As illustrated, the incoming packet 250 arrives at the hash unit 240, and the packet's identifying parameters (e.g., the five-tuple parameters of source IP address, destination IP address, source port, destination port, and connection protocol) is used to generate a hashed index for identifying connection/flow of the packet. This index is in turn supplied to the rules table 220 for stateless lookup of a matching rule. The source and destination IP addresses of the packet are used by the container table 230 to lookup containers that the IP addresses belong to. The incoming packet 250 also arrives at the stateful engine 205, which processes the header information of the incoming packet in order to monitor and to maintain the states and status of the transport layer (L4) connections for those packets. The state and status of various different L4 connections are stored in the conn-track table 210. It should be understood that packet 250 may "arrive" at stateful engine 205 by being written to a memory of host 100 (FIG. 1) and an address of the packet's location in the memory being provided or otherwise made available to stateful engine 205.

The rules table 220 stores various rules for classifying incoming packets. In some embodiments, these rules are firewall rules that determine whether a packet should be allowed or rejected. In some embodiments, for a given incoming packet, the rules table 220 is for looking up one or more applicable rules with parameters that matches the identifying parameters (e.g., connection five-tuple) of the packet. The result of the look up in the rules table 220 is provided to the stateful engine 205 as packet marking or metadata. In some embodiments, each rule in the rules table 220 is associated with a rule ID such that the results of the rules table look up provided to the stateful engine 205 includes identities of the rules that match the identifying parameters of the incoming packet 250.

As illustrated, some of the rules in the rules table 220 are rules that are defined by using express IP addresses. For example, the rule labeled '1' in the rules table 220 is a match for packets having source IP address "1.1.1.1", while the rule labeled '2' is a match for packets having destination IP address "2.2.2.2". However, some rules in the rules table 220 are defined by using security groups or IP sets, where each security or IP set is a container of IP addresses. For example, the rule labeled '3' is a match for packets having source IP address that belongs to a security group "Web", while the rule labeled '4' is a match for packets having destination IP address that belongs to a security group "App". In order to for the rules table 220 to match an incoming packet with rules that are defined by using these containers, the system has to perform a look up operation to see if a source or destination address of the incoming packet belongs to one of those containers.

The container table 230 is a table that maps IP addresses to security groups. The result of the container table look up is a container ID that can then be used to look up a matching rule in the rules table 220. As illustrated, the container table 230 includes definitions for security groups "Web", "App", "Cust", and "DB". Each of these containers is associated with one or more IP addresses. Consequently, a packet having a source IP address or a destination IP address belonging to any one (or more) of the security groups would cause the container table 230 to output the corresponding container ID or IDs. For example, if an incoming packet has a source IP address "1.2.1.2" and a destination IP address "1.3.4.9", the container table 230 would produce the container ID for the security group "App" as source and the container ID for the security group "Cust" as destination. In some embodiments, an IP address may simultaneously belong to multiple security groups. For example, the IP address "1.2.3.4" belongs to both security groups "App" and "Web", so a packet having "1.2.3.4" as source IP address would cause the container table 230 to output the container IDs of both "App" and "Web" as source. The result of the container look up is in turn provided to the stateful engine 205 as packet marking or metadata (so both container ID for both "App" and "Web" are included in the metadata.) In some embodiments, the result of the container lookup also indicate whether the provided container ID is for source address or for destination address.

In some embodiments, the rules table 220 and the container table 230 are implemented on content addressable memory (CAM) or ternary CAM (TCAM). For the container table implemented in the CAM, the source or destination address of the incoming packet is used as a key for look up in the CAM. For the rules table implemented in the CAM, the hash value of the packet's connection identifying parameters is used as a key for searching for a match in the CAM. As illustrated, the identifier hash unit 240 provides the hash value of the packet's connection identifying parameters. Operations of the rules table 220 and the container table 230 will be further described by reference to FIG. 8 below.

As illustrated, the output of the container table 230 is supplied to the rules table 220 for performing lookups of rules that uses containers as sources or destinations. The lookup result of the container table 230 is also supplied to the stateful engine 205 along with the lookup result of the rules table 220 as packet marking or metadata of the incoming packet. This is because the hardware in some embodiments may not have sufficient resource to be able to perform lookup of rules that use containers as source or destination, so the result of the container look up is forwarded (or otherwise made available) to the stateful engine 205 in order to complete the rule matching in software. In some embodiments, the hardware is able to perform rules matching for some but not all of the rules defined by containers. In these instances, the stateful engine 205 in software uses the received container IDs to complete the rule lookup. Furthermore, the output of the hash unit 240 is forwarded to the stateful engine 205. When neither the rules table 220 or the container table 230 is able to produce a useful lookup result for packet classification, the stateful engine 205 in some embodiments uses the hardware generated hash by the hash unit 240 to perform rule matching in software. In other words, when the hardware does not have sufficient resources to perform all of the stateless lookup operation needed for packet classification, at least some of the stateless lookup operations are performed in software in some embodiments. Intermediate lookup results such as the container ID produced by the container table 230 and the hash value produced by the hash unit 240 are forwarded to the software stateful engine as packet markings or metadata.

The conn-track table 210 is for storing the state and status of various different transport layer (L4) connections. The stateful engine 205 uses the stateful information stored in the conn-track table in conjunction with the stateful lookup results in order to make stateful packet classification decisions (e.g., stateful firewall decisions). Specifically, the hashed value of the connection identifiers from the hash unit 240, container ID from the container table 230, and the rule ID from the rules table 230 are used by the stateful engine to update state or status of various different connections stored in the conn-track table. The state and status stored in the conn-track table are in turn used by the stateful engine to classify a packet (e.g., to allow or to reject).

Figure 3:
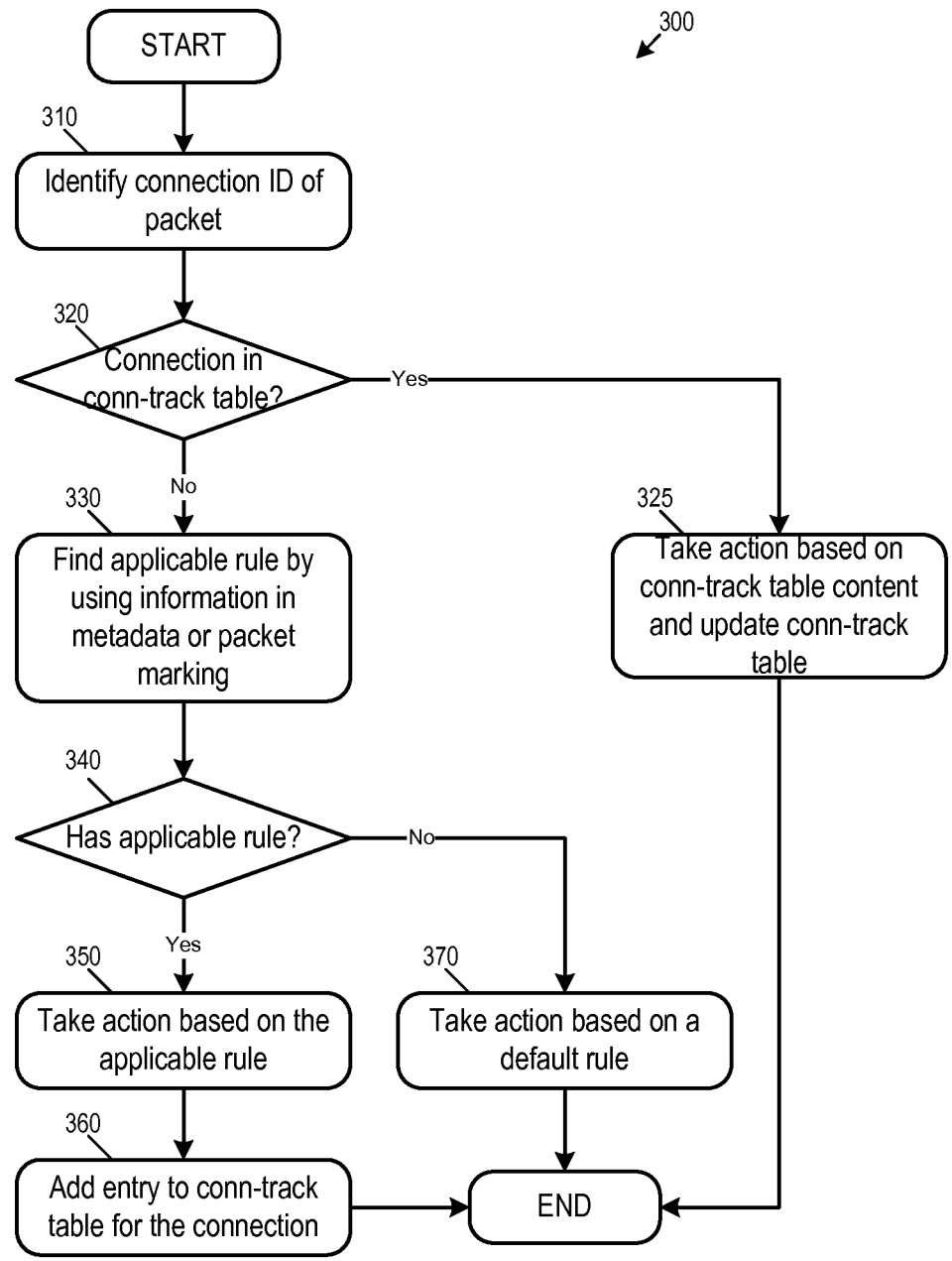
FIG. 3 conceptually illustrates a process for stateful packet classification as performed by a stateful engine.

FIG. 3 conceptually illustrates a process 300 for stateful packet classification as performed by the stateful engine 205 in some embodiments. The process 300 starts when it receives an incoming packet. The process identifies (at 310) the transport layer connection of the incoming packet by using the packet's identifying parameters (e.g., its connection five-tuple). In some embodiments, the identification of connection is hashed to produce a hashed value (by e.g., the hash unit 240) to assist in subsequent lookup operations.

The process then determines (at 320) if the identified connection has a corresponding entry in the conn-track table. If the incoming packet belongs to a connection that has yet to be established on this networking device, there would no corresponding entry in the conn-track table. For example, the conn-track table would have no entry if the incoming packet is a first packet sent for its L4 connection (e.g., the "SYN" packet a TCP connection). If identified connection has no corresponding entry in the conn-track table, the process proceeds to 330. If the identified connection has a corresponding entry in the conn-track table, the process proceeds to 325.

At 325, the process takes action based on the state and status of the stored in the conn-track table for the connection. For example, the process may decide to terminate a connection or reject a certain packet of a connection if the state and status indicates to the process the connection or the packet is no longer allowed beyond the firewall. The process also generates status and new state information for the connection and store those status and state information into the conn-track table. The process 300 then ends.

In some embodiments, if a packet belongs to a connection that already has a corresponding entry in the conn-track table, the process would not use the results of stateless lookups on the incoming packet for making stateful firewall/packet classification decisions. In some other embodiments, even if the conn-track table already has a corresponding entry, result of stateless lookups is still used for stateful firewall decision.

At 330, the process finds applicable rule by using the information in the metadata or the packet marking of the incoming packet. As mentioned, such metadata can include a rule ID, one or more container IDs, and the hash value of the connection identifiers. As mentioned, the hardware may not be able to complete stateless look up due to resource limitations (e.g., producing only container IDs when the rules table cannot complete lookup). The process uses whatever is available from metadata to find the matching rule for the incoming packet. By doing so, the software is able to leverage the hardware as much as it can in order to reduce processor usage. The process then determines (at 340) whether it is able to find an applicable rule by using the information in the metadata of the incoming packet. If so, the process 300 proceeds to 350. If the process is not able to find an applicable rule, it classifies (or takes action on) the packet based on a default rule (e.g., to always reject) and ends.

At 350, the process classifies (or takes action on) the packet based on the applicable rule that was found based on the metadata (e.g., to either reject or to accept the packet). The process then adds (360) a new entry into the conn-track table corresponding to the connection so subsequent packets of the connection would be able to find a corresponding entry in the conn-track table. The process 300 then ends.

As mentioned, in some embodiments, the stateless lookups of rules and containers are implemented in hardware, while the connection tracker lookup and the stateful engine are implemented in software. In the example of FIG. 1, the packet classification operation is an operation that is decomposed into a stateless function that is performed by the hardware in the host machine 100 (e.g., the stateless lookup 185 in the PNIC 180) and a stateful function that is performed by the software in the host machine 100 (e.g., the stateful engine 125 in the virtualization software 120). However, as mentioned above by reference to FIG. 2, the hardware in some embodiments can only perform some of the stateless lookup operations, leaving software to perform the rest of the packet classification operations. In other words, packet classification does not always decompose into stateful operations to be performed by hardware and stateless operations to be performed by software, such as when the hardware is unable to find a matching rule in the rules table 220 for some of the possible IP addresses, so the software stateful engine 205 has to complete the stateless rule look up by using the container ID or the hashed connection/flow ID supplied by hardware.

Figure 4A:
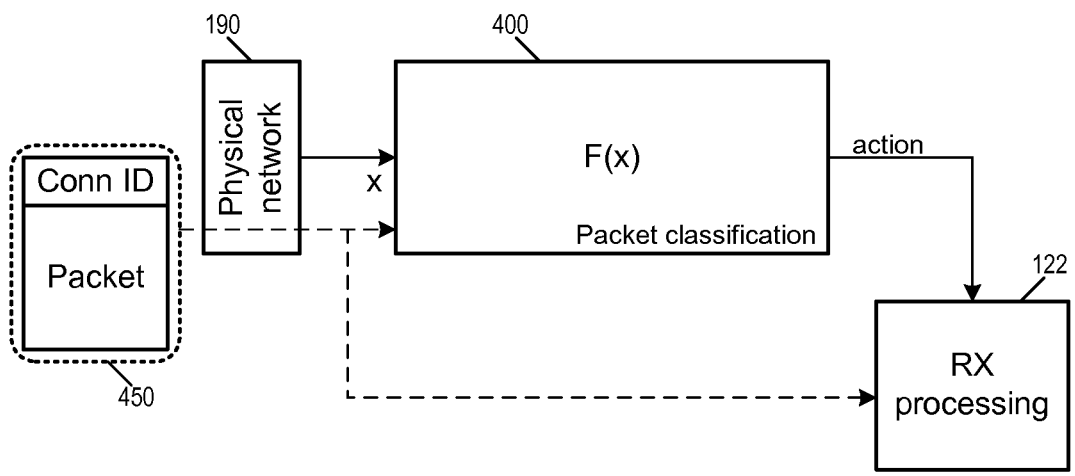
FIGS. 4a-b illustrates the decomposition of a packet classification function.

The decomposition of the packet classification operation can therefore be further generalized. FIG. 4a illustrates a generic packet classification function F(x) before it is decomposed. The argument x (i.e., the input) of the function F is an incoming packet, and the output of the function F(x) is the recommended action (or the classification) for the incoming packet x. The function F(x) is illustrated as being performed by a packet classification module 400, which receives a packet 450 from the physical network medium 190. The module 400 in turn determines an appropriate action that is to be taken by the RX processing module 122 with regard to the packet 450.

Figure 4B:
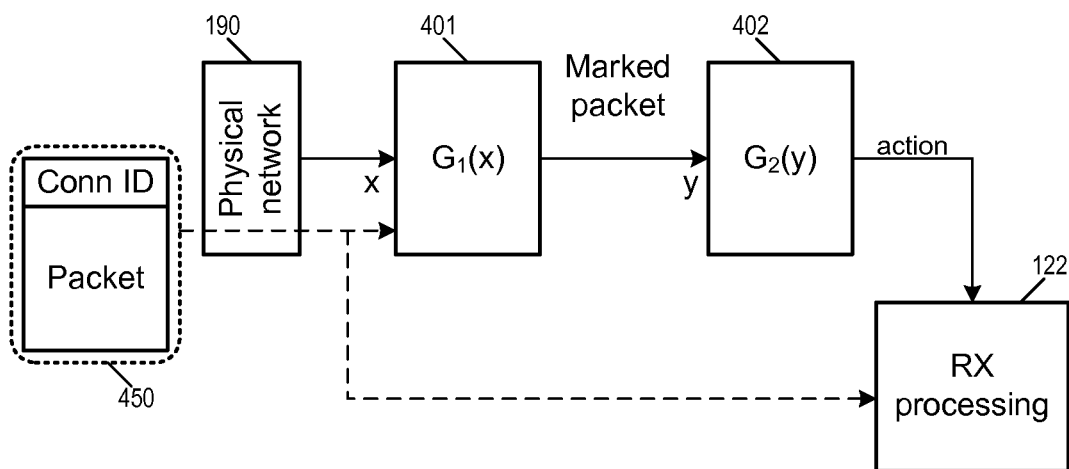

FIG. 4b illustrates the decomposition of the packet classification function F(x). Specifically, the packet classification function is decomposed into $G_1(x)$ and $G_2(y)$, which are performed by modules 401 and 402, respectively The argument x of the function $G_1$ is the packet 450, while the argument y of the function $G_2$ is the output of the function $G_1(x)$, which in some embodiments is a marked version of the packet 450. The output of the function $G_2(y)$ is in turn supplied to the RX processing module 122 for determining what action should be taken with regard to the packet 450. In other words, $F(x)=G_2(G_1(x))$.

This is a generalization of the decomposition of the packet classification operation performed by the host machine 100 in FIG. 1. In the context of FIG. 1, the packet classification operation performed by the host machine 100 as a whole is F(x). This operation is decomposed into $G_1(x)$ and $G_2(y)$, $G_1(x)$ being the stateless look up performed by the hardware of the PNIC 180 and $G_2(y)$ being the stateful engine performed by the virtualization software 120. The passing of the metadata 155 for the packet 150 allows the stateless operations of the PNIC 180 and the stateful operations of the virtualization software 120 to come together and complete packet classification of the packet 150.

Several more detailed embodiments of the invention are described below. Section I further describes hardware implementation of the stateless lookup operations. Section II further describes software implementation of the stateful packet classification operations. Section III describes an example communications device that implements some embodiments of the invention. Finally, section IV describes an electronic system with which some embodiments of the invention are implemented.

I. Implementation of Stateless Lookup in Hardware

Figure 5:
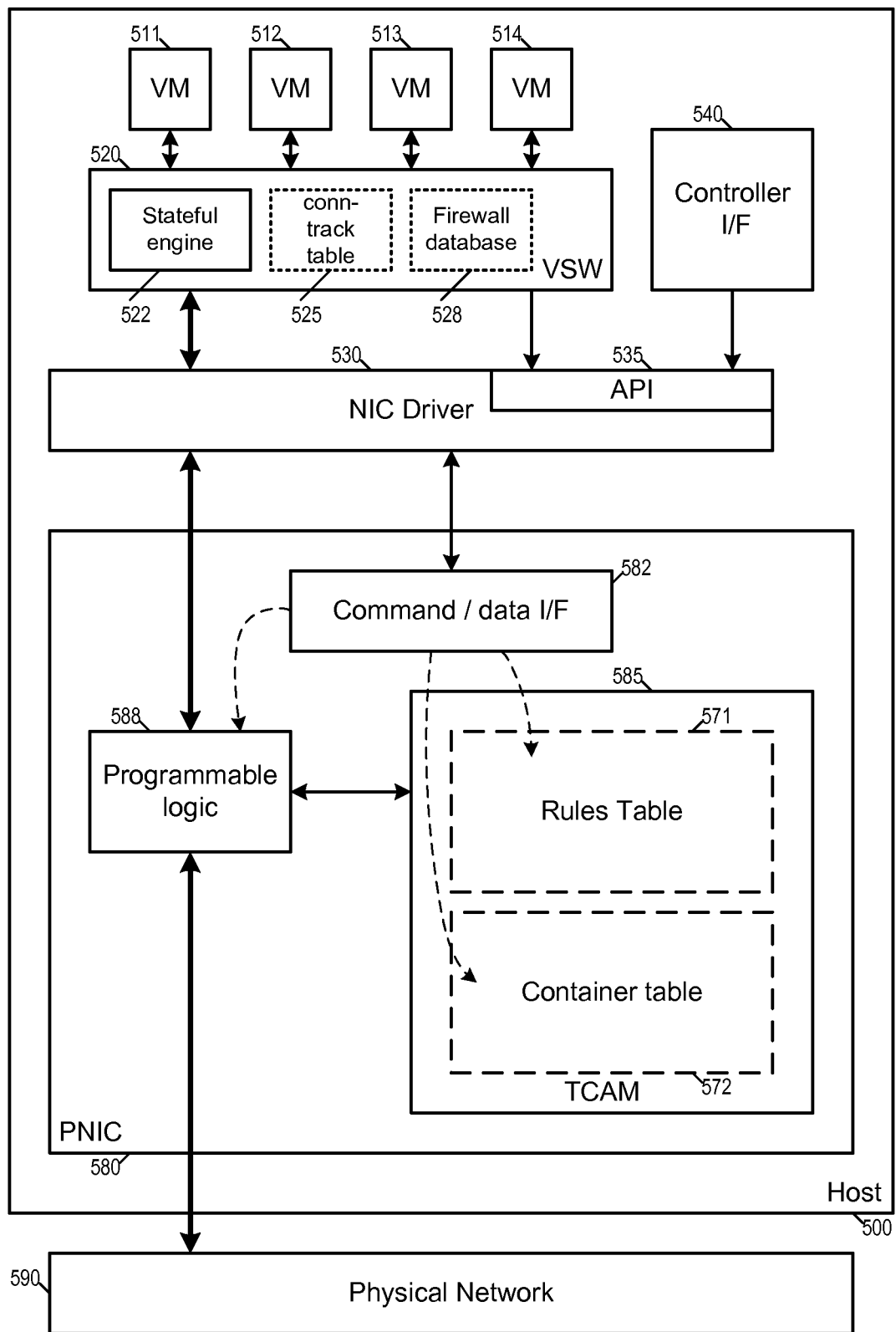
FIG. 5 illustrates an example implementation of the stateless look tables in a PNIC.

For some embodiments, FIG. 5 illustrates an example implementation of the stateless look tables in a PNIC. FIG. 5 illustrates a host machine 500 that is operating VMs 511-514, virtualization software 520, NIC driver 530, and a controller interface 540. The host machine 500 also includes a PNIC 580 as interface to a physical network 590. The virtualization software 520 is for providing network access and computing resources to the VMs 511-514. The virtualization software 520 also includes a stateful engine 522, and conn-track table 525, and a complete rules database 528 (or packet classification database) for stateful packet classification processing. The PNIC 580 on the other hand includes a command data interface 582, a TCAM 585, and a programmable logic 588. The programmable logic 588 and the TCAM 585 are programmed to implement the stateless lookup functions of the packet classification, namely a rules table 571 and a container table 572.

The control of the PNIC 580 is available to the host machine 500 through the PNIC driver 530, which provides an application program interface (API) 535 as interface for software components (including the virtualization software 520 and the controller interface 540) running on the host machine 500. In some embodiments, these various software components are programs being executed on one or more processors or processor cores in the host machine. PNIC driver 530 and controller interface 540, depending on the architecture of virtualization software 520, may each be incorporated into a kernel module (not shown) or executing kernel space (not shown) executing in user space (not shown) or within a privileged VM such as a "control," "root," or "domain zero" VM (not shown). The software components running on the host machine invokes API routines of the PNIC driver 530, which cause the driver to issue commands or send data to the command data interface 582 of the PNIC 580. The command data interface 582 in turn sends control signals or programming data to the various components of the PNIC 580.

The command data interface 582 sends programming data to the programmable logic 588 and the TCAM 585. The programmable logic 588 in some embodiments are programmable hardware resources provided to the users for performing logic operations on the PNIC. The TCAM 585 is programmed with the content of the rules table 571 and container table 572, while the programmable logic 588 is programmed to package the output of the TCAM as metadata of the incoming packets. Packets from the physical network 590 arrives at the programmable logic 588, and the programmable logic 588 forwards the packets to the NIC driver 530 en route to the virtualization software 520. The programmable logic 588 also uses parameters in the incoming packets as search keys for retrieving content from the TCAM 585. The output of the TCAM 585 is then used to produce the metadata for the stateful engine 522. In some embodiments, the programmable logic 588 is also programmed to produce a hash value of the five-tuple identifiers of the incoming packet, and the resulting hash value is in turn used by the programmable logic as a key to access the TCAM 585.

In some embodiments, the PNIC 580 may not have sufficient programmable resources and TCAM resources to produce a rule ID for all possible IP addresses. For example, the programmable logic 588 in some of these embodiments may not be able to perform a secondary lookup by using the output of the container table in the TCAM 585 (i.e., to use the lookup result of the container table 572 as part of the key to lookup a matching rule ID in the rules table 571), and consequently the output of the container lookup will have to be forwarded to software. In some instances, the size of the TCAM 585 may not be large enough to accommodate all stateless lookup rules of the firewall, and so some of the lookup will have to rely on larger memory accessible by software (e.g., by stateful engine 522 using the complete rules database 528).

In some embodiments, the programming of the TCAM 585 and programmable logic circuits 588 are driven by the virtualization software 520. As illustrated, the virtualization software 520 has access to a complete set of the firewall rules stored in the complete rules database 528. Though the host machine has sufficient resource to implement all of the rules, some of the rules can be executed more efficiently if handled by hardware stateless lookup resources such as the TCAM 585. Consequently, the virtualization software 520 would use the API 535 of the NIC driver 530 to program a portion of the rules database into the PNIC.

The controller interface 540 is a module of the host machine 500 that handles control plane messages from a central network controller (or a cluster of controlling devices). The controller interface 540 also can use the API 535, which allows the central network controller in some embodiments to directly program the hardware resources within PNIC 580 as well.

In some embodiments, the portion of the rules that is programmed into hardware includes rules that can be performed more efficiently in hardware resources. In some embodiments, the hardware resource is limited so only the rules that the hardware has resources to handle are programmed into the hardware. The software stateful engine 522 and the conn-track table 525 are in turn programmed to complete the packet classification operations based on the complete rules database 528. Generally speaking, the stateful engine 522 has to handle the residual packet classification operations that the hardware in PNIC is not programmed to handle, whether it's stateful monitoring or stateless lookup.

Figure 6B:
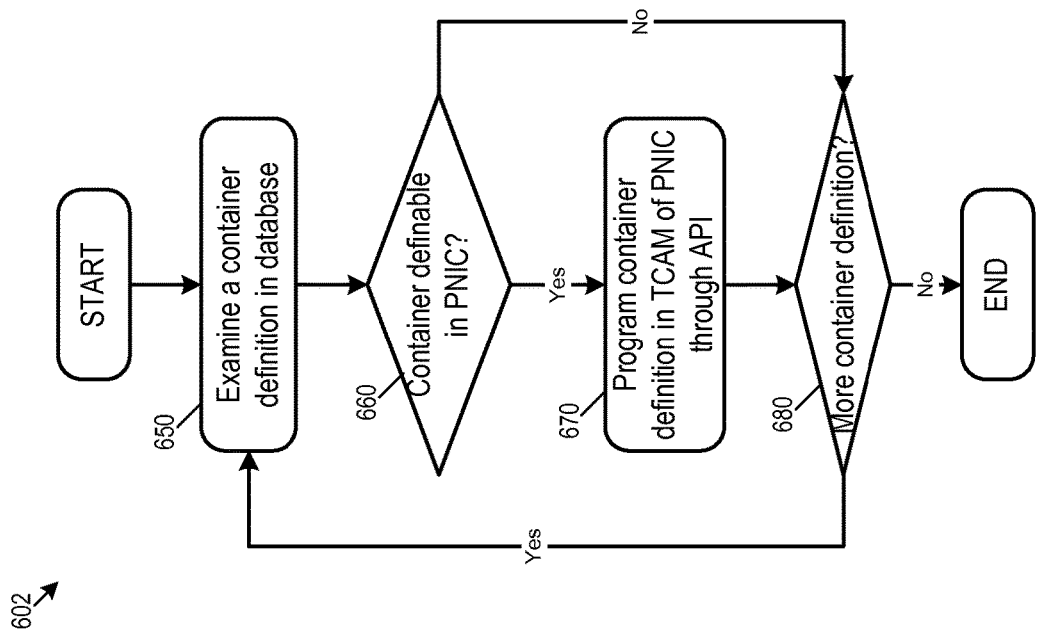
FIGS. 6a-b conceptually illustrates processes for programing the hardware resources in PNIC for handling packet classification.
Figure 6A:
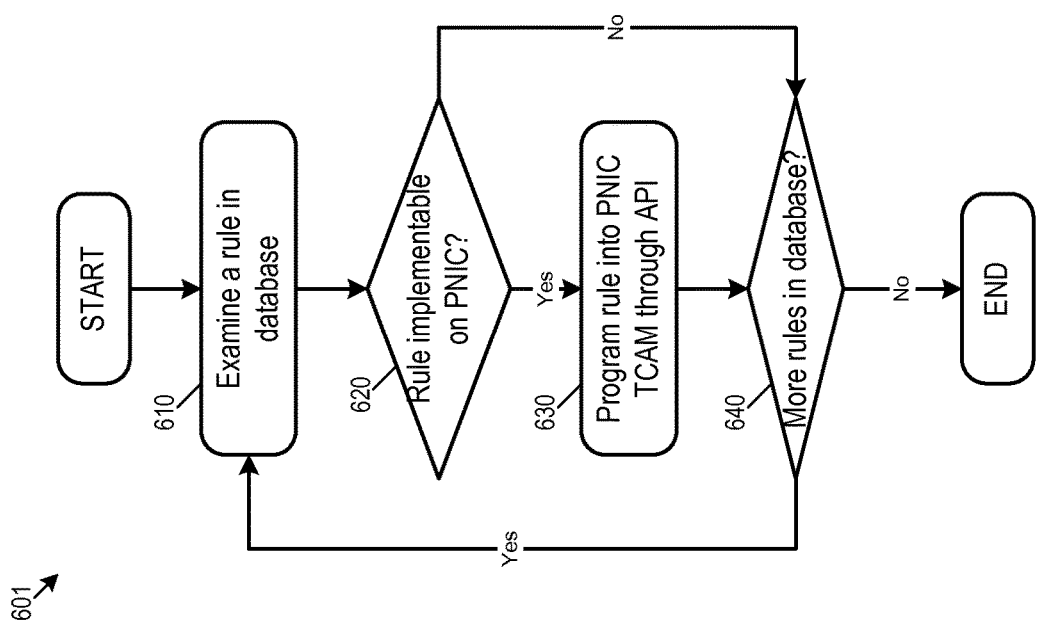

FIGS. 6a-b conceptually illustrates processes for programing the hardware resources in PNIC for handling packet classification. FIG. 6a illustrates a process 601 for programming firewall rules into the PNIC for forming a rules table. FIG. 6b illustrates a process 602 for programming container definition into the PNIC for forming a container table. In some embodiments, the processes 601 and 602 are performed by virtualization software (such as 520) running on a host machine. In some embodiments, these two processes are performed by a central network controller via a controller interface (such as 540) in the host machine.

The process 601 starts by examining (at 610) a rule from the complete database of the firewall rules. The process then determines (at 620) if the rule is implementable in the TCAM hardware (as part of the rules table). This determination is made in some embodiments according to the availability of programmable logic circuit resources as well as the memory availability in TCAM. In some embodiments, a rule requires a secondary lookup (such as to lookup which container does an IP address belongs to) that the hardware is not able handle. The process in some embodiments would therefore forego programming this rule into the TCAM and leave this rule to be implemented by software. In some embodiments, a rule that uses container as destination or source are expanded into many rules with explicit IP addresses that are contained within the container. Some of these embodiments would then program only some of the expanded rules into the TCAM (based on TCAM's storage availability). If the process determines that the rule is not implementable in hardware, the process proceeds to 640. If the process determines that the rule is implementable in hardware, the process programs (at 630) the rule into the hardware TCAM through the API of the PNIC before proceeding to 640.

At 640, the process determines if there are other rules in the rules database that have yet to be examined for suitability for hardware implementation. If so, the process returns to 610. If the process has already examined all the rules in the rules database, the process 601 ends.

The process 602 starts by examining (at 650) a container definition. In some embodiments, a firewall rules database includes definitions of containers that it recognizes. In some embodiments, the container definitions are defined in a separate, independent database.

The process then determines (at 660) if the container definition can be implemented in the TCAM hardware (as part of the container table). Some embodiments make this determination based on the available of memory storage in the TCAM, as the TCAM can be filled up with entries for other purposes. If the container definition is not implementable in hardware, the process proceeds to 680. If the container definition can be implemented in hardware, the process programs (at 670) the container definition into the TCAM through the API of the PNIC before proceeding to 680.

At 680, the process determines if there are other container definitions in the database that have yet to be examined for suitability for hardware implementation. If so, the process returns to 610 to examine other container definitions. If there are no more container definitions to be examined, the process 601 ends.

Figure 7:
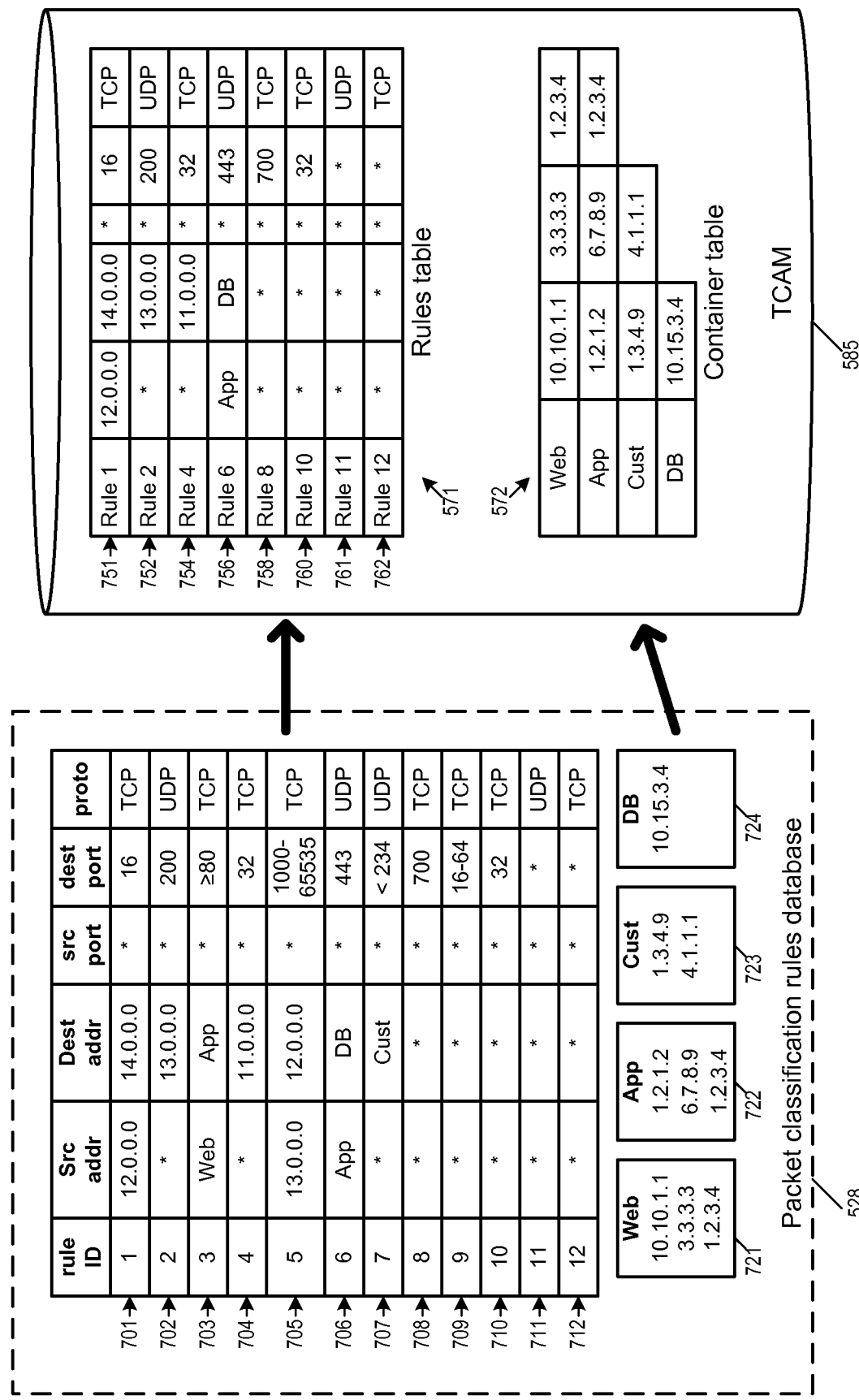
FIG. 7 conceptually illustrates the programming of the lookup tables from the complete packet classification database.

FIG. 7 conceptually illustrates the programming of the lookup tables 571 and 572 from the complete packet classification database 528. The content of the packet classification database 528 is partially programmed into the content addressable memory (TCAM) 585. As illustrated, the packet classification database 528 includes at least twelve rules 701-712, and four definitions of security groups (containers) 721-724. Some of the rules rely on containers as source or destination address (e.g., rules 703, 706, and 707). Each of the rules 701-712 has a corresponding rule ID ("Rule1" through "Rule12", respectively).

The rules in the database 528 are programed into the content addressable memory 585 in hardware as rules table 571 and container table 572. As illustrated, the rules table 571 contains 8 entries 751, 752, 754, 756, 758, 760-762 that correspond to rules 701, 702, 704, 706, 708, 710-712. In other words, rules 703, 705, and 709 were not programmed into the rules table and will have to rely on software to complete rules matching for those rules. The container table 572 includes four entries that correspond to the four containers "Web", "App", "Cust", and "DB", each entry includes the IP addresses that are included in those containers. In some embodiments (not illustrated), each entry in the containers table include only one IP addresses, so a container with multiple IP addresses would have to have multiple corresponding entries. For example, there would be three entries that correspond to the container "App" because it is a container for a security group with 3 IP addresses.

Figure 8:
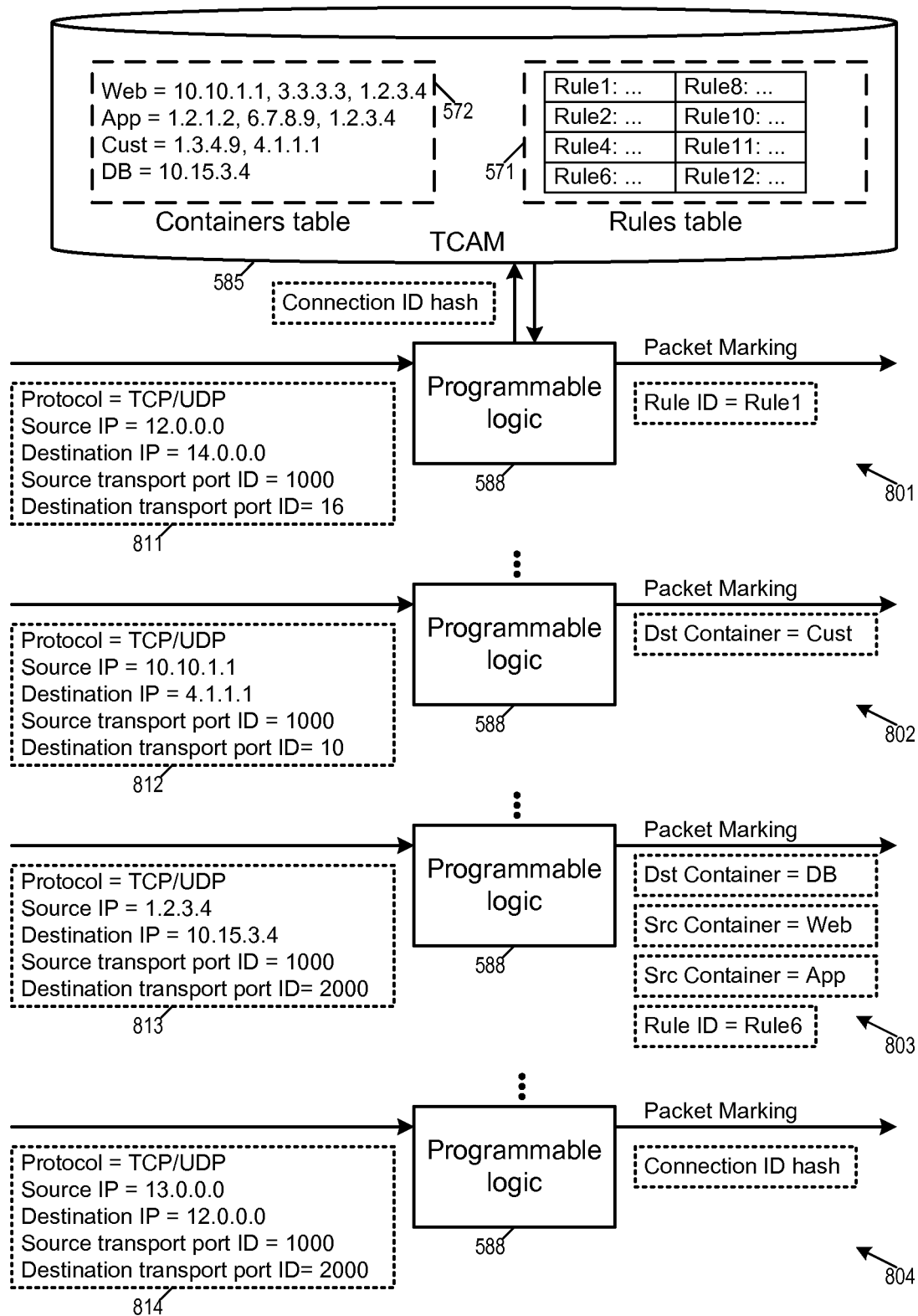
FIG. 8 illustrates several examples of lookup operations that use the lookup tables stored in a TCAM.

FIG. 8 illustrates several examples of lookup operations 801-804 that use the tables 571 and 572 stored in the TCAM 585. The lookup operations 801-804 are for classifying incoming packets 811-814, respectively. In each of these example lookup operations, the programmable logic 588 uses the connection identifying parameters in the incoming packet to generate a connection ID hash value and use that hash value to find matching entries in the TCAM 585. The programmable logic 588 then uses the output of the TCAM 585 to produce packet marking or metadata for the incoming packet to be sent to software for completion of the packet classification operation.

In operation 801, the incoming packet 811 has a connection five-tuple that includes source IP address 12.0.0.0 and destination IP address 14.0.0.0. This matches the rule in entry 751 of the rules table 571 with rule ID "rule1". The programmable logic 588 in turn generates packet marking for the incoming packet 811 that indicating the matching rule ID.

In operation 802, the incoming packet 812 has a connection five-tuple that includes source IP address 10.10.1.1 and destination IP address 4.1.1.1. The destination IP address 4.1.1.1 belong to the container "Cust", so the TCAM 585 produces the corresponding destination container ID for "Cust" for the programmable logic 588 to generate metadata/packet marking. In this example, the destination container ID of "Cust" would have matched the rule 707 ("Rule7"). However, since this rule was never programmed in the rules table, the TCAM would not be able to find a matching rule ID for the incoming packet 812, and the software will have to find the matching rule by using the destination container ID "Cust".

In operation 803, the incoming packet 813 has a connection five-tuple that includes source IP address 1.2.3.4 and destination IP address 10.15.3.4. Since the source IP address 1.2.3.4 belongs to both the container "App" and the container "Web", the TCAM 585 would produce container IDs for both "Web" and "App". The programmable logic would in turn produce packet marking/metadata that indicates "Web" and "App" as the source containers. The destination IP address 10.15.3.4 on the other hand belongs to the container "DB", so the TCAM 585 would produce container ID for "DB" according to container table 572 and the programmable logic would in turn produce packet marking/metadata that indicates "DB" as destination container. The software can in turn use these container IDs to find a matching rule in its complete rules database.

In some embodiments, the programmable logic 588 is programmed to use the produced container ID to find matching rules in the rules table 571. Since the entry 756 in the rules table (rule 6 in FIG. 7) has "App" as source and "DB" as destination, the rules table 572 would use the content of the entry 756 to produce and rule ID of "Rule6". This rule ID is also sent to software as metadata/packet marking. However, in some other embodiments, the programmable logic 588 cannot use the result of the container ID look up to perform rule ID lookup, so the software will have to use only the container IDs in the metadata to find the matching rule.

In operation 804, the incoming packet 814 has a connection five-tuple that includes source IP address 1.2.3.4 and destination IP address 10.15.3.4. Since the programmable logic 588 is not able to find a match for the connection five-tuple in the rules table 571 and the container table 572, the programmable logic 588 simply forwards the hash of the connection five-tuple (or connection ID hash) as metadata to software.

Figure 9:
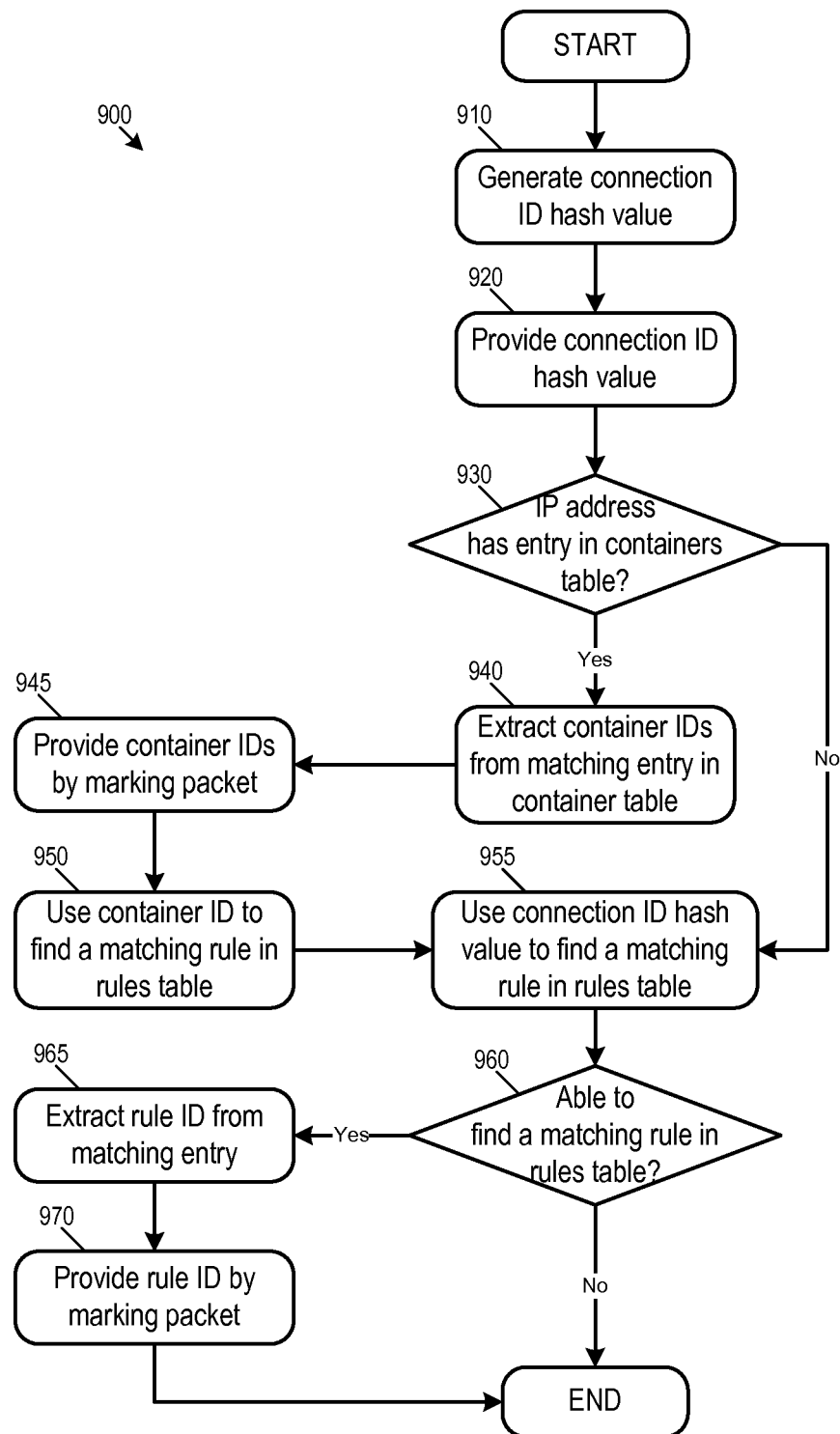
FIG. 9 conceptually illustrates a process that the hardware is programmed to perform during packet classification operations.

For some embodiments, FIG. 9 conceptually illustrates a process 900 that the hardware is programmed to perform during packet classification operations. In other words, the process 900 is the process of stateless lookup operations performed by hardware. For the example illustrated in FIGS. 5-8, the process 900 is performed by the programmable logic 588 as it produces the metadata or packet marking for incoming packets to be delivered to software.

The process 900 starts when it receives a new incoming packet from network. In some embodiments, the hardware performs stateless lookup only for the first packet of a L4 connection, (e.g., the "SYN" packet of a TCP connection). This is because the result of the stateless lookup for "SYN" packet is applicable to all packets of the connection, and the software would not need the result of stateless lookup after the first packet. In some of these embodiments the process would check to see if the packet is a "SYN" packet. If it is not a "SYN" packet, there is no need for stateless lookup and the process 900 would not start or would end immediately.

The process generates (at 910) hash value for the incoming packet's connection identifiers (e.g., its five-tuple). The process then provides (at 920) the connection ID hash value to the software as part of metadata. The process as illustrated in FIG. 9 provides the connection ID hash value regardless of whether the hardware is able to find a matching rule ID or container ID. However, in some embodiments, the process provides connection ID only when the process is not able to find a valid rule ID or container ID.

Next, the process determines (at 930) if the source or destination IP addresses of the incoming packet belongs to any IP sets/security groups/containers. In some embodiments, the process would search for a source container for the source IP address and a destination container for the destination IP address. If the process is able to find matching entry or entries in the container table, the process proceeds to 940. Otherwise, the process proceeds to 960.

At 940, the process extracts container IDs from the matching entry or entries in the container table. As mentioned, in some embodiments, some IP addresses may belong to multiple security groups and therefore result in multiple matching entries in the container table. In these instances, the process would retrieve multiple container IDs from the TCAM, and those multiple container IDs will forwarded to software as metadata for the incoming packet. Furthermore, in some embodiments, the process would indicate whether the container ID is for the source IP address (hence the container ID is for a source container) or for the destination IP address (hence the container ID is for a destination container). Consequently, for one incoming packet, the process may produce several container IDs, some as destination container IDs, and some as source container IDs.

The process then provides (945) the extracted container IDs as metadata or packet marking to software for stateful packet classification operations. The process 900 as illustrated provides extracted container IDs to software ID regardless of whether the process is able to use the extracted container ID to find a matching rule in the rules table within hardware stateless lookup. However, in some embodiments, the process provides extracted container IDs only if it is not able to use the extracted container ID to find a matching rule in the rules table within hardware stateless lookup.

The process then uses (at 950) the extracted container IDs to find a matching rule in the rules table. As mentioned, some rules in the rules table uses containers as destination or source instead of explicit IP addresses. The process therefore uses the extracted container IDs to find the matching rule in the rules table. However, as mentioned, the hardware in some embodiments does not have sufficient resource to support using identified containers to find a matching entry in the rules table. In those instances the process would not be able to find a matching rule in the rules table using the extracted container IDs.

Next, the process uses (at 955) the generated connection ID hash value to find a matching rule in the rules database. In some embodiments, the connection ID hash value is generated based on source and destination IP addresses of the incoming packet (as included in the five-tuple), therefore this search only targets rules that use explicit IP address as destination and source, not those rules with containers. However, in some embodiments, the process would expand the containers specified in each rule of the rules database into their corresponding IP addresses so the process can use the connection ID hash to find a matching rule. For a PNIC that has a TCAM that is programmed to include a rules table, the process uses the hashed value as a search key to find an entry in the TCAM. The process then proceeds to 960.

At 960, the process determines (at 960) whether it is able to find a matching rule in the rules table by using the connection ID hash value and/or the container IDs. If the process is able to find a match in the rules table, the process proceeds to 965. Otherwise, the process 900 ends.

At 965, the process extracts rule ID from the matching entry in the rules table. In some embodiments, the rule's ID is part of the entry stored in the TCAM. The process then provides (at 970) the rule ID to software by marking the packet or by embedding the rule ID in the metadata of the incoming packet. The process 900 then ends.

II. Software for Stateful Packet Classification

As mentioned, in some embodiments, the software running on a networking device is responsible for performing the stateful packet classification (i.e., stateful firewall) operation on incoming packets. It receives marked packets or metadata that includes results of stateless lookup operations performed by hardware. These stateless lookup results may include the identifications of the rule that matches the connection of the packet, the identification of containers (i.e., security groups or IP sets) that the source and destination IP addresses of the incoming packet belong to, or the hash value of the connection identifiers. However, in some embodiments, the hardware may provide only some of the stateless lookup result (e.g., only the container ID or only the hashed connection ID). Regardless what is actually provided by hardware, the software in some embodiments uses its conn-track table to perform stateful firewall operations. In some embodiments, the software also has stateless lookup capabilities to complete the stateless lookup operations that the hardware is unable to complete.

Figure 10:
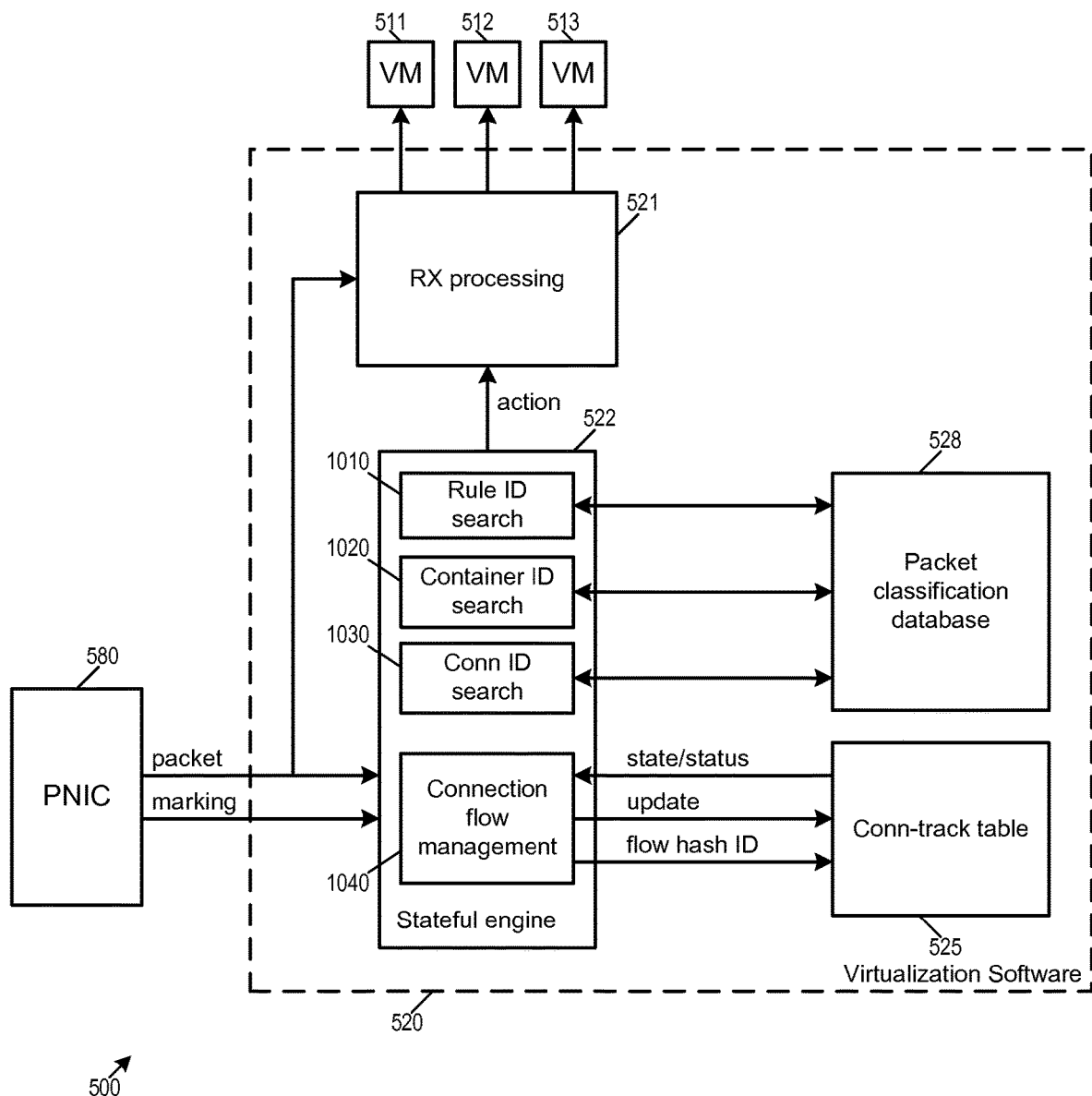
FIG. 10 illustrates an example block diagram of the software that performs stateful packet classification in a host machine.

FIG. 10 illustrates an example block diagram of the software that performs stateful packet classification in the host machine 500 of FIG. 5. The software handles both stateful processing and rules lookup based on packet marking or metadata provided by software. In some embodiments, the software that handles stateful packet classification in a host machine is its virtualization software, which also manages the computing and network resources for virtual machines.

As illustrated, the host machine 500 includes virtualization software 520 and PNIC 580. The virtualization software 520 is for operating the VMs 511-514, and the PNIC 580 is serving as the host machine's interface to the physical network medium. The virtualization software 520 includes a RX processing module 521, the stateful engine 522, the conn-track table 525, and the packet classification database 528. The stateful engine 522 receives packet marking/metadata for the incoming packet from the hardware in PNIC 580 and determines what action the RX processing module 521 should take with regard to the incoming packet. The stateful engine uses the conn-track table 525 to perform stateful connection protocol handshaking and the packet classification database 528 to perform stateless lookup operations.

As illustrated, the stateful engine 522 includes a rule ID search engine 1010, a container ID search engine 1020, a connection ID search engine 1030, and a connection flow management 1040. The connection flow management 1040 uses the conn-track table 525 for updating and monitoring the handshaking state of the different L4 connections. As mentioned, the metadata provided by hardware may include a rule ID, container IDs, or a hashed connection ID, and the stateful engine 522 will use whatever is provided by the hardware to find a matching rule in its complete rules database 528. To this end, the rule ID search engine 1010 uses the rule ID (if present in the metadata) to search for a matching rule in the packet classification database 528. Likewise, the container ID search engine 1020 uses the container ID (if present in the metadata) and the connection ID search engine 1030 uses the hashed connection ID to search for a matching rule in the packet classification database 528. The stateful engine 522 then uses the matching rule from the database 528 in conjunction with the stateful connection processing performed by the connection flow management module 1040 to decide the action or the classification for the incoming packet. In some embodiments, the stateful engine 522 also uses the hashed connection ID provided by hardware to assist in fetching the state and status of a L4 connection from the conn-track table 525.

Figure 11:
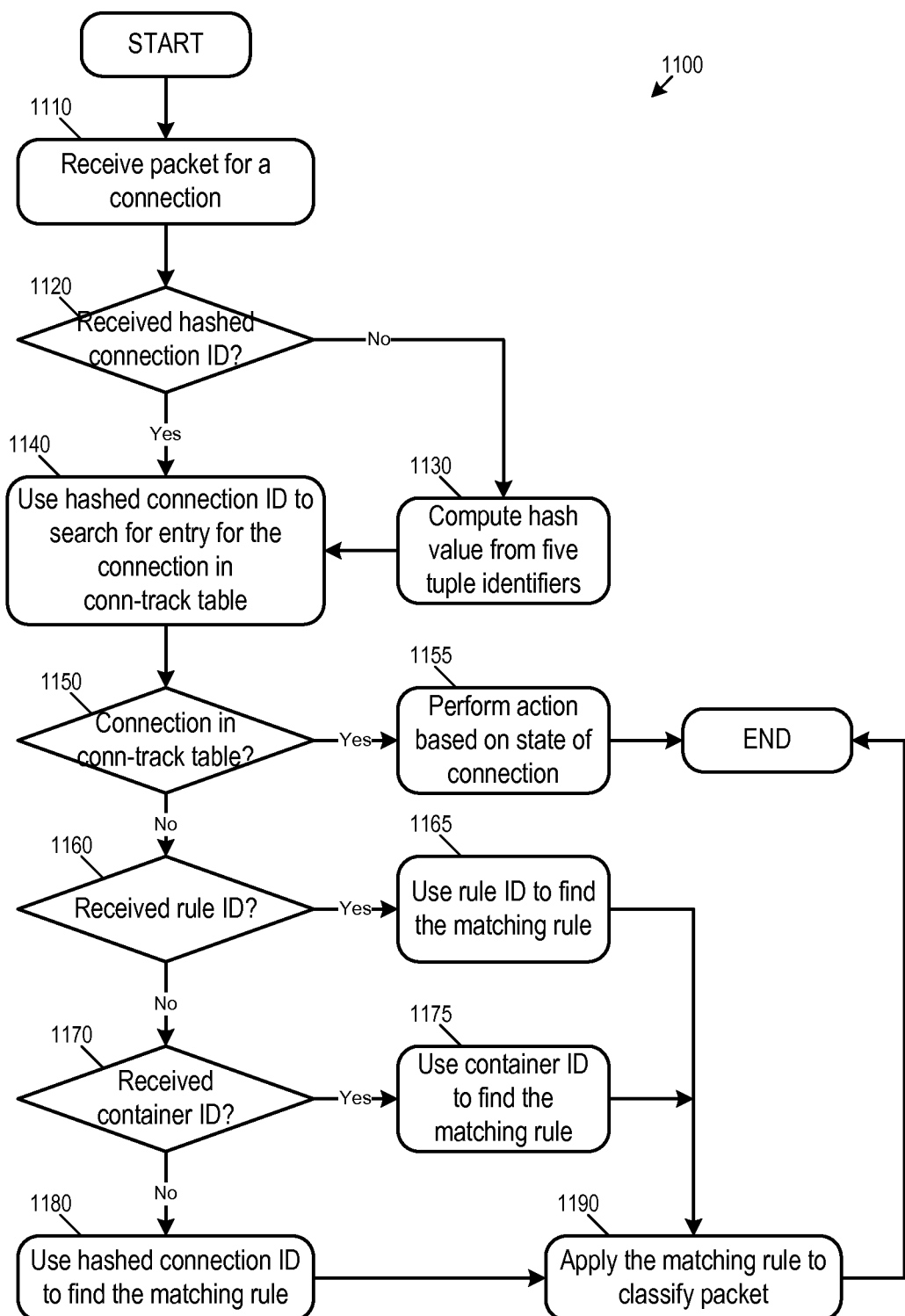
FIG. 11 conceptually illustrates a process for performing stateful packet classification operations based on metadata or packet marking provided by hardware.

FIG. 11 conceptually illustrates a process 1100 for performing stateful packet classification operations based on metadata or packet marking provided by hardware. In some embodiments, the process 1100 is performed by a software stateful engine for packet classification such as the stateful engine 522 of FIG. 5 and FIG. 10. The process 1100 starts when the process receives (at 1100) a packet that is either marked or is accompanied by metadata from PNIC hardware. The packet in some embodiments having a connection level header (e.g., a TCP header) that specifies a particular connection that the packet is for.

The process then determines (at 1120) if it had received a hashed connection/flow ID for the connection/flow of the packet. If so, the process proceeds to 1140. Otherwise, the process proceeds to 1130 to compute a hashed value from the connection/flow ID (i.e., its five-tuple) before proceeding to 1140.

At 1140, the process uses the hashed connection ID to search for an entry in the conn-track table for the connection/flow of the packet. The process then determines (at 1150) whether there is such an entry in the conn-track table. In some embodiments, the conn-track table would not have an entry for a connection/flow if the connection/flow has not been established. This could be because the stateful engine has not received a packet for this L4 connection (e.g., this packet is the first "SYN" packet of a TCP connection), or if this connection is not allowed by the firewall rules. If there is an existing entry for the connection in the conn-track table, the process proceeds to 1155. Otherwise, the process proceeds to 1160.

At 1155, the process performs action (e.g., classifying the incoming packet) based on the state of the connection retrieved from the conn-track table. In some embodiments, the process at this point no longer consults stateless rule lookups to decide whether to allow the packet, but rely only in the state and status stored in the conn-track table for the classification decision. The process in some embodiments rejects the packet if the packet is at an incorrect state, or if the status of the connection does not allow this particular packet. The process in some embodiments also updates the state and status of the connection in the conn-track table. After performing the action based on the state of the connection, the process 1100 ends.

At 1160, the process determines whether it has received a rule ID from the hardware through the metadata or packet marking. If the hardware does not provide a rule ID for this packet, the process proceeds to 1170. If the hardware has provided a rule ID, the process proceeds to 1165 to use the received rule ID to find the matching rule for the connection in the complete firewall rules database. In some embodiments, this is a simple index to address translation that allows the process to immediately locate the matching rule from the rules database without searching. After finding the matching rule in the complete rules database by using the rule ID, the process proceeds to 1190.

At 1170, the process determines if it has received one or more container IDs provided by the hardware through the metadata or packet marking. If the hardware does not provide any container ID, the process proceeds to 1180. If the hardware has provided at least one container ID, the process proceeds to 1175

At 1175, the process uses the received container IDs to find the matching rule for the connection in the complete firewall rules database. This in some embodiments involves searching the entire database for rules that uses the received container IDs as destinations and/or sources. In some embodiments, though this operation is more time consuming than using a rule ID to directly identify a rule in the database, it is nevertheless highly advantageous since the process would not need to perform an address to container lookup before searching for the matching rule. The received container IDs allows the process to immediately start examining rules that use the identified containers as source and/or destination addresses. For the example rules database 528, receiving a source container ID for "App" and a destination container ID for "DB" would allow the process to identify the rule 706 as a matching rule, even if the process has not received a rule ID for the rule 706. After finding the matching rule in the complete rules database by using the received container IDs, the process proceeds to 1190.

At 1180, the process uses hashed connection ID to assist in finding the matching rule for the connection in the complete firewall rules database, since the hardware is not able to provide a rule ID or a container ID. This in some embodiments involves searching the entire database for rules that can map to a five-tuple parameter that matches the hash connection ID, even those rules that are defined by containers or wildcards. In some embodiments, at least some of the rules in the rules database are stored at address locations that are indexed by hash values of connection five-tuples and are thus directly addressable by the hashed connection ID. After finding the matching rule in the complete rules database by using the hashed connection ID, the process proceeds to 1190.

At 1190, the process apply the matching rule to classify the packet, e.g., deciding whether to accept or reject the packet. The process 1100 then ends.

Figure 12:
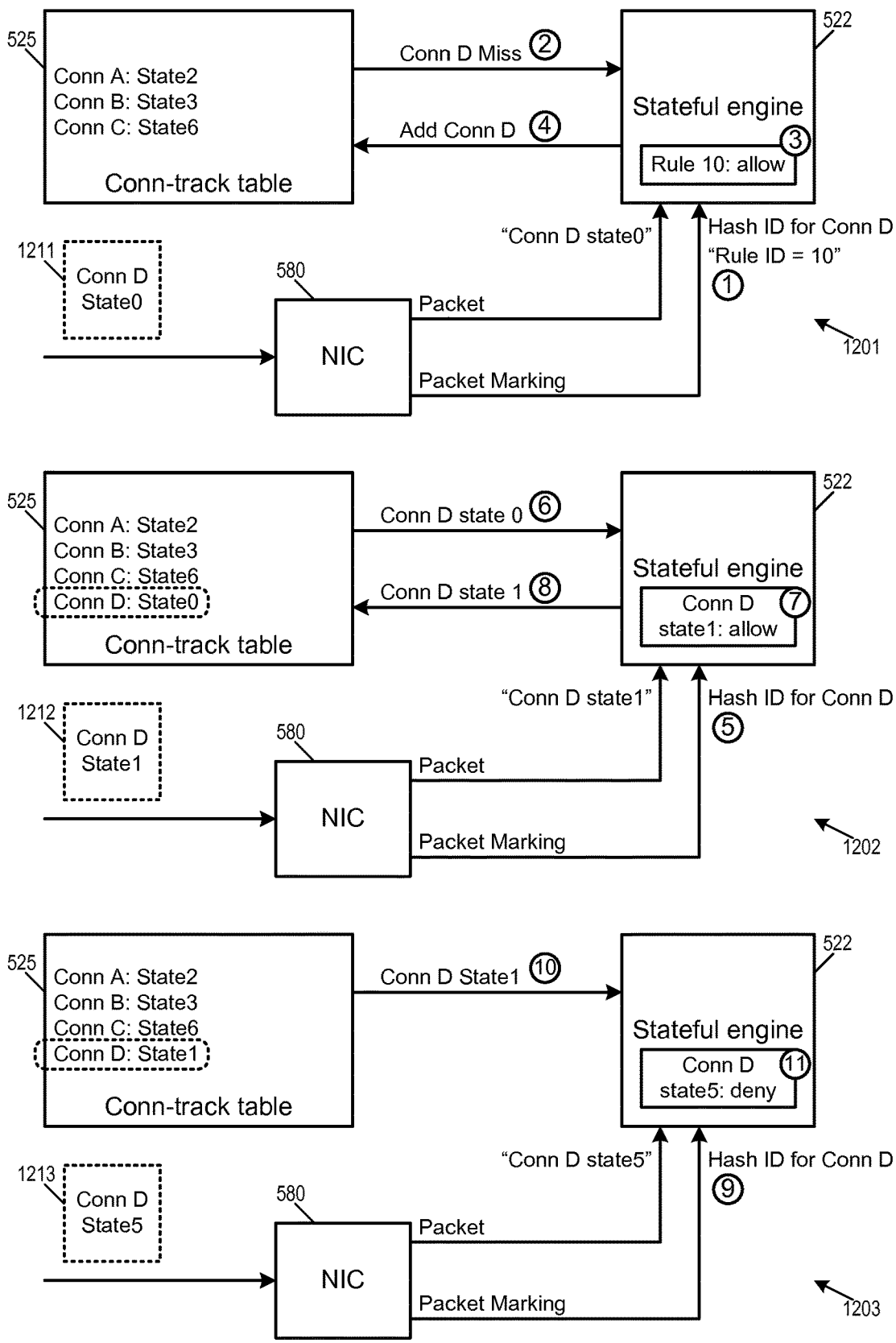
FIGS. 12-13 illustrate several examples of stateful packet classification performed by software.
Figure 13:
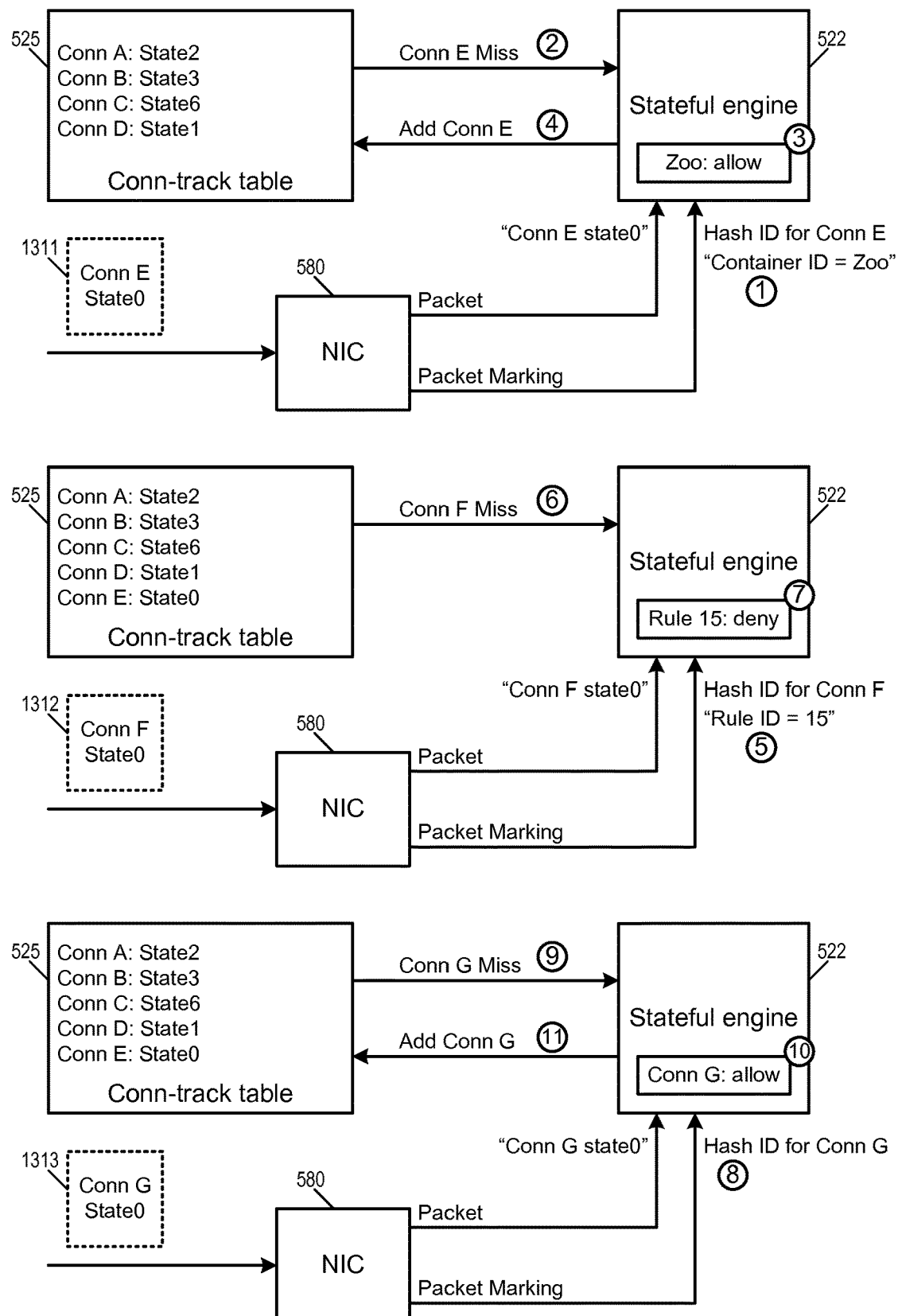

FIGS. 12-13 illustrate several examples of stateful packet classification performed by software in some embodiments. Specifically, the figure illustrates the action of the stateful engine 522 in the host machine 500 with regard to a series of different incoming packets based on the content of the conn-track table 525, the packet classification database 528, and the packet marking/metadata provided by the hardware in the PNIC 580. In some embodiments, the stateful engine 522 in these examples is performing the process 1100.

FIG. 12 illustrates a sequence of incoming packets 1211, 1212, and 1213. Each of the packets 1211-1213 belongs to a L4 connection session "D". Prior to the arrival of the first incoming packet 1211 at the host machine 500, the conn-track table has state and status for three existing L4 connections "A", "B", and "C", but not for connection "D". The figure shows the arrival of the packets 1211, 1212, and 1213, in that order, at the stateful engine 522.

The packet 1211 is a first packet in the L4 connection session "D" at an initial state "state0". In some embodiments, this corresponds to the "SYN" packet of the TCP protocol. The packet 1211 arrives at PNIC 580, which relays the hashed connection ID for "D" to the stateful engine. The PNIC 580 also produces a rule ID "10" that matches the incoming packet 1211 (operation labeled '1'). The stateful engine 522 uses the hashed connection ID to check for state for connection "D" in the conn-track table 525. However, since this is the first packet for the connection "D", there is no entry in the conn-track table for this connection. Consequently, the conn-track table 525 informs the stateful engine that there is no connection "D" in the conn-track table 525 (operation labeled '2'). The stateful engine 522 then uses the rule ID provided by the hardware to check the complete rules database 528 to see if the connection "D" should be allowed (operation labeled '3'). As the rules database indicates that the connection should be allowed, the stateful engine adds connection "D" to the conn-track table 525 (operation labeled '4').

The packet 1212 then arrives at the host machine 500. The packet 1212 is also a packet for the connection "D", but at the next state "state1" of the connection protocol. The packet 1212 arrives at PNIC 580, which relays the hashed connection ID for "D" to the stateful engine (operation labeled '5'). The stateful engine uses the hashed connection ID to check the state of the connection "D" in the conn-track table 525. As there is already an entry for connection D from the previous packet 1212, the conn-track table 525 has a corresponding entry for the connection (operation labeled '6'). Since there is already an entry for the connection in the conn-track table, the stateful engine does not check the rules database but instead rely on the state and status stored in the conn-track table to perform stateful packet classification. The stateful engine checks the state of the packet 1212 and allows it based on the content of the conn-track table 525 (operation '7'). The stateful engine then updates the entry for connection "D" in the conn-track table (operation '8').

The packet 1213 next arrives at the host machine 500. The packet 1213 is also a packet for the connection "D", but at an incorrect state "state5" of the connection protocol. The packet 1213 arrives at PNIC 580, which relays the hashed connection ID for "D" to the stateful engine (operation labeled '9'). The stateful engine 522 uses the hashed connection ID to check for state for connection "D" in the conn-track table 525. As there is already an entry for connection D from previous packets, the conn-track table 525 has a corresponding entry for the connection (operation labeled '10'). The stateful engine checks the state of the packet 1213 against the conn-track table entry for connection "D" and realizes the packet 1213 has an incorrect state. The stateful engine then rejects the packet (operation '11').

FIG. 13 illustrates another sequence of packets 1311-1313 that arrives at the host machine 500. Each of the packet 1311-1313 is a packet at the initial state of its connection (i.e., "SYN" of TCP protocol) and has no corresponding entry in the conn-track table 525. For each of these packets, the stateful engine uses the metadata provided by the hardware in PNIC 580 to search for a matching rule in the complete rules database 528 in order to determine whether the packet should be allowed and whether to add the connection to the conn-track table 525.

The packet 1311 is a packet at initial state "state0" for connection E. The packet 1311 arrives at PNIC 580, which relays the hashed connection ID for "E" to the stateful engine 522. The PNIC 580 is not able to produce a rule ID, but it does provide a container ID "Zoo" for the stateful engine 522 (operation labeled '1'). The stateful engine uses the hashed connection ID to check for state for connection "E" in the conn-track table 525. However, since this is the first packet for the connection "E", there is no entry in the conn-track table for this connection. Consequently, the conn-track table 525 informs the stateful engine that there is no connection "E" in the conn-track table 525 (operation labeled '2'). The stateful engine 522 then uses the container ID "Zoo" provided by the hardware to check the complete rules database 528 to see if the connection "E" should be allowed (operation labeled '3'). As the rules database indicates that the connection should be allowed, the stateful engine adds connection "E" to the conn-track table 525 (operation labeled '4').

The packet 1312 is also a packet at initial state "state0", but for a different connection "F". The packet 1312 arrives at PNIC 580, which relays the hashed connection ID for "F" to the stateful engine 522. The PNIC 580 is also able to produce a rule ID "15" (operation labeled '5'). The stateful engine 522 uses the hashed connection ID to check for state for connection "F" and found no entry in the conn-track table for this connection (operation labeled '6'). The stateful engine 522 then uses the rule ID "15" provided by the hardware to check the complete rules database 528 to see if the connection "F" should be allowed (operation labeled '7'). As the rules database indicates that the connection should be rejected, the stateful engine does not add connection "F" to the conn-track table 525.

The packet 1313 is also a packet at initial state "state0", but for a different connection "G". The packet 1312 arrives at PNIC 580, which relays the hashed connection ID for "G" to the stateful engine. The PNIC 580 is not able to produce a rule ID or a container ID for the connection (operation labeled '8'). The stateful engine uses the hashed connection ID to check for state for connection "G" and found no entry in the conn-track table for this connection (operation labeled '9'). Since hardware was not able to provide a rule ID or a container ID, the stateful engine can only rely on the hashed connection ID for "G" to perform search for matching rule in the complete rules database 528 (operation labeled '10'). As the rules database indicates that the connection "G" should be allowed, the stateful engine adds the connection "G" to the conn-track table 525 (operation labeled '11').

As mentioned, in some embodiments, the packet classification system as described above is implemented in host machines of virtual machines. In some embodiments, these virtual machines are operating in different logical networks, such as different VXLANs or VLANs. In some embodiments, each logical network has its own set of firewall rules. In some embodiments, the hardware TCAM of a host machine is programmed with multiple sets of lookup tables (e.g., rules table and container table) for multiple different tenants with different logical network identifiers, (e.g., VNIs, or VXLAN Network Identifiers). Some embodiments program the PNIC hardware (e.g., the PNIC's programmable logic 588) to use the VNI bits in the VXLAN header of the incoming packet to select the corresponding set of lookup tables in the TCAM.

Figure 14:
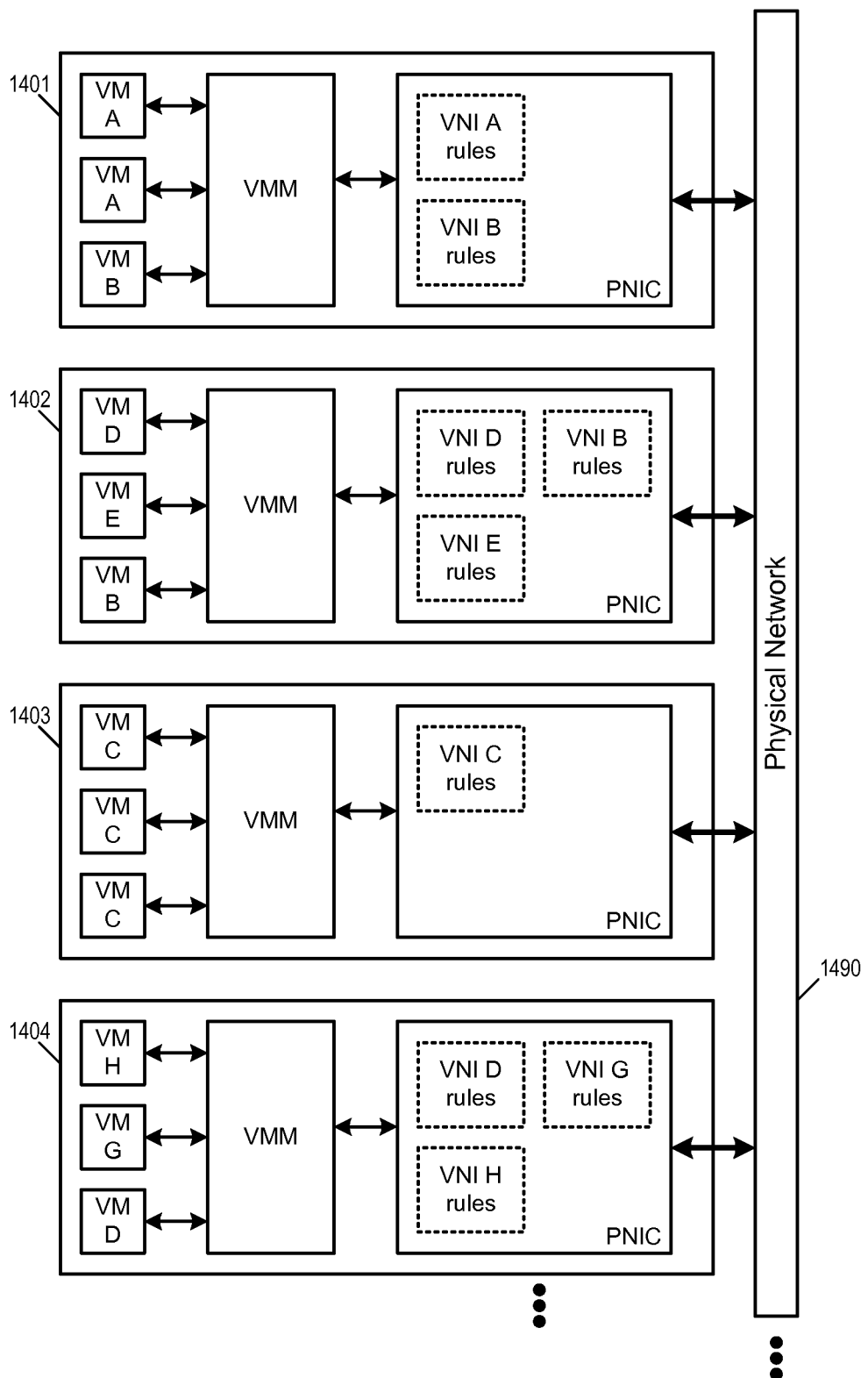
FIG. 14 illustrates PNICs that are programmed with different sets of firewall rules depending on the VMs being hosted.

To conserve computation and storage resources, in some embodiments, each host machine implements only the firewall rules for the logical networks that the host machine's VMs belong to. Specifically, the hardware (in PNIC) in those embodiments is only programed to handle the stateless lookups (or portions thereof) for logical networks of the VMs that the host machine is hosting. FIG. 14 illustrates PNICs that are programmed with different sets of firewall rules depending on the VMs being hosted.

FIG. 14 illustrates a physical network 1490 interconnecting host machines 1401-1404. The physical network is supporting several different logical networks (logical networks 'A' through 'H'), each of these logical networks having its own set of firewall rules. Furthermore, each logical network is identifiable by its own VNI. These VNIs are embedded in each incoming packet so a host machine and its PNIC would be able to identify to which logical network the incoming packet belongs to. In some embodiments, both software and hardware of the host machine uses the VNI in the packet to determine which set of firewall rules should be applied.

As illustrated, each host machine is hosting VMs in some but not necessarily all of the different logical networks. For example, the host machine 1401 is hosting VMs in logical networks 'A' and 'B', while the host machine 1404 is hosting VMs in logical networks 'D' and 'G' and 'H'. Each host machines in turn programs its PNIC with only the firewall rules and container definitions needed by the VMs that it is hosting (e.g., to program the TCAM in the host machine's PNIC with only the rules tables and containers tables that are needed by the VMs that the host machine is hosting). Thus, for example, the PNIC of the host machine 1401 is programmed with only the firewall rules for logical networks 'A' and 'B', while the PNIC of the host machine 1404 is programmed with only the firewall rules for logical networks 'D', 'G', and 'H'.

III. Communications Device

Figure 15:
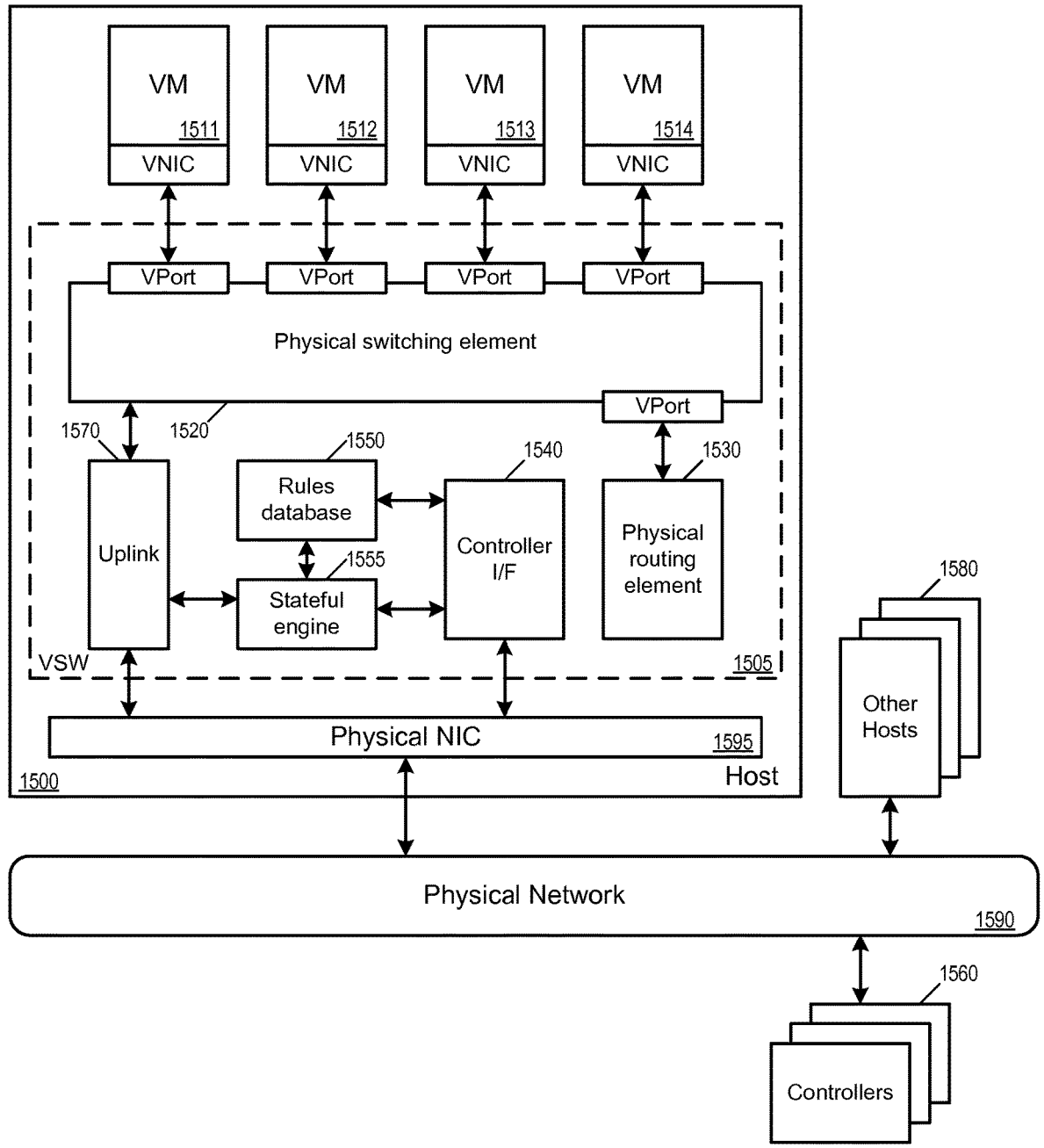
FIG. 15 illustrates an example host machine that is operating virtualization software.

As mentioned earlier, some embodiments of the invention are implemented by virtualization software or hypervisors running on host machines. For some embodiments, FIG. 15 illustrates an example host machine 1500 that is operating virtualization software 1505. The virtualization software 1505 allows the host machine to host virtual machines 1511-1514 as well as connecting the virtual machines to a physical network 1590. This physical network 1590 may span one or more data centers and include various physical switches and routers.

As illustrated, the host machine 1500 has access to the physical network 1590 through a physical NIC (PNIC) 1595. The virtualization software 1505 serves as the interface between the hosted VMs 1511-1514 and the physical NIC 1595 (as well as other physical resources, such as processors and memory). Each of the VMs includes a virtual NIC (VNIC) for accessing the network through the virtualization software 1505. Each VNIC in a VM is responsible for exchanging packets between the VM and the virtualization software 1505. In some embodiments, the VNICs are software abstractions of physical NICs implemented by virtual NIC emulators.

The virtualization software 1505 manages the operations of the VMs 1511-1514, and includes several components for managing the access of the VMs to the physical network (by implementing the logical networks to which the VMs connect, in some embodiments). As illustrated, the virtualization software 1505 includes a physical switching element 1520, a physical routing element 1530, a controller interface 1540, an uplink module 1570, a rules database 1550, and a stateful engine 1555.

The controller interface 1540 receives control plane messages from a controller or a cluster of controllers 1560. In some embodiments, these control plane message includes configuration data for configuring the various components of the virtualization software and/or the virtual machines (such as the physical switching element 1520 and the physical routing element 1530). In some embodiments, the control plane messages also include programming information for lookup tables in PNIC hardware as discussed by reference to FIG. 5 above.

The rules database 1550 stores the complete set firewall rules. In some embodiments, the database includes multiple sets of firewall rules for different logical networks. The stateful engine 1555 performs stateful packet classification by using the rules database 1550 as well as a conn-track table.

The physical switching element 1520 delivers network data to and from the physical NIC 1595, which interfaces the physical network 1590. The physical switching element also includes a number of virtual ports (vPorts) that communicatively interconnects the physical NIC with the VMs 1511-1514, the physical routing element 1530 and the controller interface 1540. Each virtual port is associated with a unique L2 MAC address, in some embodiments. The physical switching element performs L2 link layer packet forwarding between any two network elements that are connected to its virtual ports. The physical switching element also performs L2 link layer packet forwarding between any network element connected to any one of its virtual ports and a reachable L2 network element on the physical network 1590 (e.g., another VM running on another host).

The physical routing element 1530 performs L3 routing (e.g., by performing L3 IP address to L2 MAC address resolution) on data packets received from a virtual port on the physical switching element 1520. Each routed data packet is then sent back to the physical switching element 1520 to be forwarded to its destination according to the resolved L2 MAC address. This destination can be another VM connected to a virtual port on the physical switching element 1520, or a reachable L2 network element on the physical network 1590 (e.g., another VM running on another host, a physical non-virtualized machine, etc.).

The uplink module 1570 relays data between the physical switching element 1520 and the physical NIC 1595. In some embodiments, the uplink module 1570 allows the host machine 1500 to serve as a tunnel endpoint for encapsulation overlay networks such as VXLAN and VLANs. VXLAN is an overlay network encapsulation protocol. An overlay network created by VXLAN encapsulation is sometimes referred to as a VXLAN network, or simply VXLAN. When a VM on the host 1500 sends a data packet (e.g., an ethernet frame) to another VM in the same VXLAN network but on a different host, the uplink module 1570 encapsulates the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The uplink module 1570 also decapsulates incoming VXLAN packets and forwards only the original inner data packet to the destination VM.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

Figure 16:
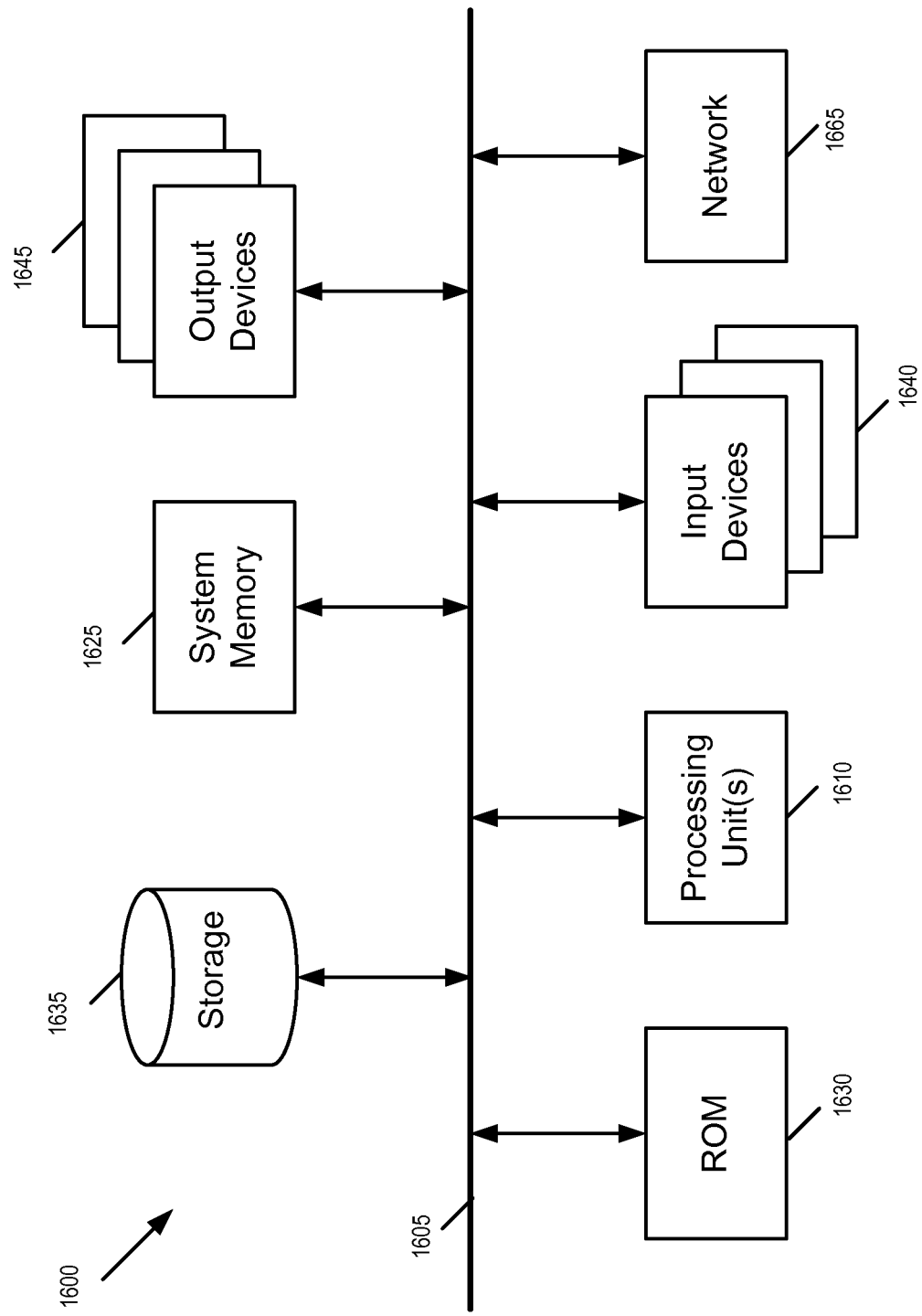
FIG. 16 conceptually illustrates an electronic system with which some embodiments of the invention are implemented.

FIG. 16 conceptually illustrates an electronic system 1600 with which some embodiments of the invention are implemented. The electronic system 1600 can be used to execute any of the control, virtualization, or operating system applications described above. The electronic system 1600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1600 includes a bus 1605, processing unit(s) 1610, a system memory 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the system memory 1625, and the permanent storage device 1635.

From these various memory units, the processing unit(s) 1610 retrieves instructions to execute and data to process in order to execute the processes of the invention. The processing unit(s) may be a single processor or a multi-core processor in different embodiments.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash drive, etc.) as the permanent storage device. Like the permanent storage device 1635, the system memory 1625 is a read-and-write memory device. However, unlike storage device 1635, the system memory is a volatile read-and-write memory, such a random access memory. The system memory stores some of the instructions and data that the processor needs at runtime. In some embodiments, the invention's processes are stored in the system memory 1625, the permanent storage device 1635, and/or the read-only memory 1630. From these various memory units, the processing unit(s) 1610 retrieves instructions to execute and data to process in order to execute the processes of some embodiments.

The bus 1605 also connects to the input and output devices 1640 and 1645. The input devices enable the user to communicate information and select commands to the electronic system. The input devices 1640 include alphanumeric keyboards and pointing devices (also called "cursor control devices"). The output devices 1645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 16, bus 1605 also couples electronic system 1600 to a network 1665 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3, 6, 9, and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine-readable medium storing a program which when executed by one or more processing units statefully classifies network packets belonging to transport layer connections, the program comprising sets of instructions for:
   receiving, from a physical network interface controller (PNIC), (i) an incoming packet and (ii) a set of identifiers generated for the incoming packet by a stateless lookup operation performed at the PNIC using identifiers of a transport layer connection to which the incoming packet belongs;
   determining whether a connection-tracking data storage stores any record for the transport layer connection;
   when the data storage stores a record for the transport layer connection, performing a first stateful operation on the incoming packet based on a first action specified by the stored record; and
   when the data storage does not store any record for the transport layer connection, (i) using the received set of identifiers generated by the PNIC to identify a rule applicable to the incoming packet, (ii) performing a second stateful operation on the incoming packet based on a second action specified by the identified rule, and (iii) storing a new record in the connection-tracking data storage for the transport layer connection to which the incoming packet belongs, the new record for use in performing stateful operations on subsequent packets belonging to the transport layer connection.

2. The non-transitory machine-readable medium of claim 1, wherein the set of instructions for using the received set of identifiers generated by the PNIC to identify the rule applicable to the incoming packet comprises a set of instructions for identifying a packet classification rule that matches at least a subset of the received set of identifiers.

3. The non-transitory machine-readable medium of claim 2, wherein the set of instructions for using the received set of identifiers generated by the PNIC to identify the rule applicable to the incoming packet further comprises a set of instructions for using a set of identifiers for containers to identify the packet classification rule when the received set of identifiers does not comprise an identifier for the packet classification rule.

4. The non-transitory machine-readable medium of claim 1, wherein the set of identifiers includes a hash value of a set of identifying parameters for the transport layer connection, wherein the set of instructions for determining whether the connection-tracking data storage stores any record for the transport layer connection comprises a set of instructions for using the hash value to determine whether the connection-tracking data storage stores a record with a hash value that matches the hash value included in the set of identifiers.

5. The non-transitory machine-readable medium of claim 2, wherein the subset of the received set of identifiers comprises a set of header values of the incoming packet.

6. The non-transitory machine-readable medium of claim 1, wherein the received set of identifiers generated by the PNIC are only used to identify a rule when the incoming packet is an initial packet of the transport layer connection.

7. The non-transitory machine-readable medium of claim 4, wherein the hash value is generated by the PNIC to offload generation of the hash value from the program that performs stateful operations on incoming packets.

8. A method for statefully classifying network packets belonging to transport layer connections, the method comprising:
   receiving, from a physical network interface card (PNIC), (i) an incoming packet and (ii) a set of identifiers generated for the incoming packet by a stateless lookup operation performed at the PNIC using identifiers of a transport layer connection to which the incoming packet belongs;
   determining whether a connection-tracking data storage stores any record for the transport layer connection;
   when the data storage stores a record for the transport layer connection, performing a first stateful operation on the incoming packet based on a first action specified by the stored record; and
   when the data storage does not store any record for the transport layer connection, (i) using the received set of identifiers generated by the PNIC to identify a rule applicable to the incoming packet, (ii) performing a second stateful operation on the incoming packet based on a second action specified by the identified rule, and (iii) storing a new record in the connection-tracking data storage for the transport layer connection to which the incoming packet belongs, the new record for use in performing stateful operations on subsequent packets belonging to the transport layer connection.

9. The method of claim 8, wherein using the received set of identifiers generated by the PNIC to identify the rule applicable to the incoming packet comprises identifying a packet classification rule that matches at least a subset of the received set of identifiers.

10. The method of claim 9, wherein using the received set of identifiers generated by the PNIC to identify the rule applicable to the incoming packet further comprises the using a set of identifiers for containers to identify the packet classification rule when the received set of identifiers does not comprise an identifier for the packet classification rule.

11. The method of claim 10, wherein the subset of the received set of identifiers comprises a set of header values of the incoming packet.

12. The method of claim 8, wherein:
   the set of identifiers includes a hash value of a set of identifying parameters for the transport layer connection; and
   determining whether the connection-tracking data storage stores any record for the transport layer connection comprises using the hash value to determine whether the connection-tracking data storage stores a record with a hash value that matches the hash value included in the set of identifiers.

13. The method of claim 12, wherein the hash value is generated by the PNIC to offload generation of the hash value from a program that performs stateful operations on incoming packets.

14. A computer comprising:
   a set of processing units; and
   a non-transitory machine readable medium storing a program which when executed by the set of processing units statefully classifies network packets belonging to transport layer connections, the program comprising sets of instructions for:
      receiving, from a physical network interface card (PNIC), (i) an incoming packet and (ii) a set of identifiers generated for the incoming packet by a stateless lookup operation performed at the PNIC using identifiers of a transport layer connection to which the incoming packet belongs;

determining whether a connection-tracking data storage stores any record for the transport layer connection;

when the data storage stores a record for the transport layer connection, performing a first stateful operation on the incoming packet based on a first action specified by the record; and when the data storage does not store any record for the transport layer connection, (i) using the received set of identifiers generated by the PNIC to identify a rule applicable to the incoming packet, (ii) performing a second stateful operation on the incoming packet based on a second action specified by the identified rule, and (iii) storing a new record in the connection-tracking data storage for the transport layer connection to which the incoming packet belongs, the new record for use in performing stateful operations on subsequent packets belonging to the transport layer connection.

15. The computer of claim 14, wherein the set of instructions for using the received set of identifiers generated by the PNIC to identify the rule applicable to the incoming packet comprises a set of instructions for identifying a packet classification rule that matches at least a subset of the received set of identifiers.

16. The computer of claim 15, wherein the set of instructions for using the received set of identifiers generated by the PNIC to identify the rule applicable to the incoming packet further comprises a set of instructions for using a set of identifiers for containers to identify the packet classification rule when the received set of identifiers does not comprise an identifier for the packet classification rule.

17. The computer of claim 16, wherein the subset of the received set of identifiers comprises a set of header values of the incoming packet.

18. The computer of claim 14, wherein:
the set of identifiers includes a hash value of a set of identifying parameters for the transport layer connection; and
the set of instructions for determining whether the connection-tracking data storage stores any record for the transport layer connection comprises a set of instructions for using the hash value to determine whether the connection-tracking data storage stores a record with a hash value that matches the hash value included in the set of identifiers.

19. The computer of claim 14, wherein the received set of identifiers generated by the PNIC are only used to identify a rule when the incoming packet is an initial packet of the transport layer connection.

20. The method of claim 14, wherein the received set of identifiers generated by the PNIC are only used to identify a rule when the incoming packet is an initial packet of the transport layer connection.

* * * * *